(12) United States Patent
Wang et al.

(10) Patent No.: US 11,573,858 B2
(45) Date of Patent: Feb. 7, 2023

(54) SYSTEMS AND METHODS FOR OPERATION RETRY

(71) Applicant: BEIJING DIDI INFINITY TECHNOLOGY AND DEVELOPMENT CO., LTD., Beijing (CN)

(72) Inventors: Hongfeng Wang, Beijing (CN); Yu Wang, Beijing (CN); Duokun Zhang, Beijing (CN)

(73) Assignee: BEIJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 131 days.

(21) Appl. No.: 17/109,168

(22) Filed: Dec. 2, 2020

(65) Prior Publication Data

US 2021/0109812 A1 Apr. 15, 2021

Related U.S. Application Data

(63) Continuation of application No. PCT/CN2019/091470, filed on Jun. 17, 2019.

(30) Foreign Application Priority Data

Jun. 25, 2018 (CN) .......................... 201810659641.6

(51) Int. Cl.
*G06F 11/14* (2006.01)
*H04L 1/18* (2006.01)
*H04L 67/564* (2022.01)

(52) U.S. Cl.
CPC ............ *G06F 11/1407* (2013.01); *H04L 1/18* (2013.01); *H04L 1/189* (2013.01); *H04L 67/564* (2022.05);

(Continued)

(58) Field of Classification Search
None
See application file for complete search history.

(56) References Cited

U.S. PATENT DOCUMENTS 11,356,508 B1 * 6/2022 Vergara ................... H04L 67/06
2019/0042367 A1 2/2019 Li

FOREIGN PATENT DOCUMENTS

CN 101646142 A 2/2010
CN 101895846 A 11/2010
(Continued)

OTHER PUBLICATIONS

International Search Report in PCT/CN2019/091470 dated Sep. 18, 2019, 4 pages.

(Continued)

*Primary Examiner* — Afshawn M Towfighi
(74) *Attorney, Agent, or Firm* — Metis IP LLC

(57) ABSTRACT

The present disclosure relates to systems and methods for operation retry. The system may determine whether a retry is allowed for a target operation based on a retry strategy included in a retry proxy component. In response to determining that the retry is allowed for the target operation, the system may execute the target operation. The system may detect whether there is an exception associated with the execution of the target operation. In response to determining that there is the exception associated with the execution of the target operation, the system may determine whether a retry is needed for the target operation based on the retry strategy. In response to determining that the retry is unneeded for the target operation, the system may stop the target operation.

19 Claims, 14 Drawing Sheets

(52) U.S. Cl.
CPC ...... *G06F 2201/86* (2013.01); *G06F 2201/88* (2013.01); *H04L 1/1854* (2013.01)

(56) References Cited

FOREIGN PATENT DOCUMENTS

CN        105095022 A     11/2015
CN        110554930 B  *   5/2022

OTHER PUBLICATIONS

Written Opinion in PCT/CN2019/091470 dated Sep. 18, 2019, 4 pages.

* cited by examiner

SYSTEMS AND METHODS FOR OPERATION RETRY

CROSS-REFERENCE TO RELATED APPLICATIONS

This application is a Continuation of International Application No. PCT/CN2019/091470, filed on Jun. 17, 2019, which claims priority of Chinese Patent Application No. 201810659641.6 filed on Jun. 25, 2018, the contents of each of which are hereby incorporated by reference in its entirety.

TECHNICAL FIELD

The present disclosure generally relates to data processing, and in particular, to systems and methods for operation retry.

BACKGROUND

In business codes, there may be a scenario where multiple retries are executed for a specific operation. For example, when a request for accessing a remote server to obtain user information (e.g., requester information, provider information) is initiated, the request may fail due to network reasons, thus it is needed to initiate multiple network requests until the user information is obtained successfully. In order to solve this problem, a loop statement (e.g., a "for" loop statement) may be used. However, using the loop statement may result in a high server pressure or confused codes. Therefore, it is desirable to provide systems and methods for efficient and brief operation retry.

SUMMARY

An aspect of the present disclosure relates to a method for operation retry. The method may include initiating a retry proxy component, wherein the retry proxy component includes a retry strategy; determining whether a retry is allowed for a target operation based on the retry strategy; executing the target operation in response to determining that the retry is allowed for the target operation; determining whether there is an exception associated with the execution of the target operation; determining whether a next retry is needed for the target operation based on the retry strategy in response to determining that there is the exception associated with the execution of the target operation; determining whether the next retry is allowed for the target operation based on the retry strategy in response to determining that the next retry is needed for the target operation; and stopping the execution of the target operation in response to determining that the next retry is unneeded for the target operation.

In some embodiments, the method may further include determining a number count of retries that have been executed for the target operation.

In some embodiments, the method may further include sleeping the execution of the target operation for a predetermined sleep time in response to determining that the next retry is needed for the target operation; and determining whether the next retry is allowed for the target operation based on the retry strategy after the predetermined sleep time has passed, wherein the predetermined sleep time may be expressed as $T_i = N \times i + T_{i-1}$, where i refers to the number count of retries which is a positive integer, $T_0 = 0$, and N refers to a predetermined time.

In some embodiments, the retry strategy may include whether the number count of retries reaches a predetermined count threshold and/or whether the predetermined sleep time reaches a predetermined time threshold. The method may further include determining whether the number count of retries reaches the predetermined count threshold and/or whether the predetermined sleep time reaches the predetermined time threshold; and determining that the next retry is allowed for the target operation in response to determining that the number count of retries does not reach the predetermined count threshold and/or the predetermined sleep time does not reach the predetermined time threshold.

In some embodiments, the retry strategy further may include whether the target operation satisfies a predetermined retry condition. The method may further include determining whether the target operation satisfies the predetermined retry condition; and determining that the next retry is needed for the target operation in response to determining that the target operation does not satisfy the predetermined retry condition.

In some embodiments, the method may further include receiving a target operation parameter before determining whether the retry is allowed for the target operation based on the retry strategy; and obtaining the target operation based on the target operation parameter.

Another aspect of the present disclosure relates to a system for operation retry. The system may include an initiation module, a first determination module, an execution module, a second determination module, and a third determination module. The initiation module may be configured to initiate a retry proxy component, wherein the retry proxy component may include a retry strategy. The first determination module may be configured to determine whether a retry is allowed for a target operation based on the retry strategy. The execution module may be configured to execute the target operation in response to determining that the retry is allowed for the target operation. The second determination module may be configured to determine whether there is an exception associated with the target operation. The third determination module may be configured to determine whether a next retry is needed for the target operation based on the retry strategy in response to determining that there is the exception associated with the execution of the target operation. The first determination module may be further configured to determine whether the next retry is allowed for the target operation in response to determining that the next retry is needed for the target operation. The execution module may be further configured to stop the execution of the target operation in response to determining that the next retry is unneeded for the target operation.

In some embodiments, the system may further include a counting module. The counting module may be configured to determine a number count of retries that have been executed for the target operation.

In some embodiments, the first determination module may be specifically configured to sleep the execution of the target operation for a predetermined sleep time in response to determining that the next retry is needed for the target operation and determine whether the next retry is allowed for the target operation based on the retry strategy after the execution of the target operation is slept for the predetermined sleep time, wherein the predetermined sleep time may be expressed as $T_i = N \times i + T_{i-1}$, where i refers to the number count of retries which is a positive integer, $T_0 = 0$, and N refers to a predetermined time.

In some embodiments, the retry strategy may include whether the number count of retries reaches a predetermined count threshold and/or whether the predetermined sleep time reaches a predetermined time threshold. The first determination module may be specifically configured to determine whether the number count of retries reaches the predetermined count threshold and/or whether the predetermined sleep time reaches the predetermined time threshold and determine that the next retry is allowed for the target operation in response to determining that the number count of retries does not reach the predetermined count threshold and/or the predetermined sleep time does not reach the predetermined time threshold.

In some embodiments, the retry strategy may further include whether the target operation satisfies a predetermined retry condition. The third determination module may be specifically configured to determine whether the target operation satisfies the predetermined retry condition and determine that the next retry is needed for the target operation in response to determining that the target operation does not satisfies the predetermined retry condition.

In some embodiments, the system further may include an obtaining module. The obtaining module may be configured to receive a target operation parameter before whether the retry is allowed for the target operation is determined based on the retry strategy and obtain the target operation based on the target operation parameter.

A further aspect of the present disclosure relates to a computer device including a storage, a processor, and a computer program stored on the storage and executed on the processor. When the processor executes the computer program, the method for operation retry may be implemented.

A still further aspect of the present disclosure relates to a computer readable storage medium storing a computer program thereon. When the computer program is executed by a processor, the method for operation retry may be implemented.

A still further aspect of the present disclosure relates to a system for operation retry. The system may include a storage device to store a set of instructions and a processor communicatively coupled to the storage device. The system may execute the set of instructions to determine whether a retry is allowed for a target operation based on a retry strategy included in a retry proxy component. In response to determining that the retry is allowed for the target operation, the system may execute the target operation. The system may detect whether there is an exception associated with the execution of the target operation. In response to determining that there is the exception associated with the execution of the target operation, the system may determine whether a retry is needed for the target operation based on the retry strategy. In response to determining that the retry is unneeded for the target operation, the system may stop the target operation.

In some embodiments, in response to a predetermined event, the retry proxy component may be initiated manually or be automatically triggered.

In some embodiments, the system may further determine whether the target operation satisfies a predetermined retry condition included in the retry strategy. In response to determining that the target operation does not satisfy the predetermined retry condition, the system may determine that the retry is needed for the target operation.

In some embodiments, in response to determining that the retry is needed for the target operation, the system may further determine whether the retry is allowed for the target operation based on the retry strategy. In response to determining that the retry is allowed for the target operation, the system may execute the target operation.

In some embodiments, in response to determining that the retry is needed for the target operation, the system may further set a predetermined sleep time, wherein the predetermined sleep time may be associated with a number count of retries that have been executed for the target operation. After the predetermined sleep time has passed, the system may determine whether the retry is allowed for the target operation based on the retry strategy.

In some embodiments, the retry strategy may include the number count of retries that have been executed for the target operation and/or the predetermined sleep time set for the retry for the target operation. The system may further determine whether the number count of retries that have been executed for the target operation reaches a count threshold and/or whether the predetermined sleep time reaches a time threshold. In response to determining that the number count of retries that have been executed for the target operation does not reach the count threshold or the predetermined sleep time does not reach the time threshold, the system may determine that the retry is allowed for the target operation.

In some embodiments, the system may further obtain at least one target operation parameter and obtain the target operation based on the at least one target operation parameter.

In some embodiments, the target operation may include at least one of accessing a database, reading or writing a file, and/or initiating a remote call.

In some embodiments, the target operation may be associated with an operating function included in the retry proxy component.

A still further aspect of the present disclosure relates to a method implemented on a computing device having at least one processor, at least one storage medium, and a communication platform connected to a network. The method may include determining whether a retry is allowed for a target operation based on a retry strategy included in a retry proxy component; in response to determining that the retry is avowed for the target operation, executing the target operation; detecting whether there is an exception associated with the execution of the target operation; in response to determining that there is the exception associated with the execution of the target operation, determining whether a retry is needed for the target operation based on the retry strategy; and in response to determining that the retry is unneeded for the target operation, stopping the target operation.

In some embodiments, in response to a predetermined event, the retry proxy component may be initiated manually or be automatically triggered.

In some embodiments, the method may further include determining whether the target operation satisfies a predetermined retry condition included in the retry strategy and determining that the retry is needed for the target operation in response to determining that the target operation does not satisfy the predetermined retry condition.

In some embodiments, the method may further include determining, whether the retry is allowed for the target operation based on the retry strategy in response to determining that the retry is needed for the target operation and executing the target operation in response to determining that the retry is allowed for the target operation.

In some embodiments, the method may further include setting a predetermined sleep time in response to determining that the retry is needed for the target operation, wherein the predetermined sleep time may be associated with a number count of retries that have been executed for the target operation; and determining whether the retry is allowed for the target operation based on the retry strategy after the predetermined sleep time has passed.

In some embodiments, the retry strategy may include the number count of retries that have been executed for the target operation and/or the predetermined sleep time set for the retry for the target operation. The method may further include determining whether the number count of retries that have been executed for the target operation reaches a count threshold and/or whether the predetermined sleep time reaches a time threshold; and determining that the retry is allowed for the target operation in response to determining that the number count of retries that have been executed for the target operation does not reach the count threshold or the predetermined sleep time does not reach the time threshold.

In some embodiments, the method may further include obtaining at least one target operation parameter and obtaining the target operation based on the at least one target operation parameter.

In some embodiments, the target operation may include at least one of accessing a database, reading or writing a file, and/or initiating a remote call.

In some embodiments, the target operation may be associated with an operating function included in the retry proxy component.

A still further aspect of the present disclosure relates to a system for operation retry. The system may include a first determination module, an execution module, a detection module, and a second determination module. The first determination module may be configured to determine whether a retry is allowed for a target operation based on a retry strategy included in a retry proxy component. The execution module may be configured to execute the target operation in response to determining that the retry is allowed for the target operation. The detection module may be configured to detect whether there is an exception associated with the execution of the target operation. The second determination module may be configured to determine whether a retry is needed for the target operation based on the retry strategy in response to determining that there is the exception associated with the execution of the target operation. The first determination module may be further configured to stop the target operation in response to determining that the retry is unneeded for the target operation.

In some embodiments, in response to a predetermined event, the retry proxy component may be initiated manually or be automatically triggered.

In some embodiments, the second determination module may be further configured to determine whether the target operation satisfies a predetermined retry condition included in the retry strategy and determine that the retry is needed for the target operation in response to determining that the target operation does not satisfy the predetermined retry condition.

In some embodiments, the first determination module may be further configured to determine whether the retry is allowed for the target operation based on the retry strategy in response to determining that the retry is needed for the target operation. The execution module may further be configured to execute the target operation in response to determining that the retry is allowed for the target operation.

In some embodiments, the first determination module may be further configured to set a predetermined sleep time in response to determining that the retry is needed for the target operation, wherein the predetermined sleep time may be associated with a number count of retries that have been executed for the target operation. After the predetermined sleep time has passed, the first determination module may be further configured to determine whether the retry is allowed for the target operation based on the retry strategy.

In some embodiments, the retry strategy may include the number count of retries that have been executed for the target operation and/or the predetermined sleep time set for the retry for the target operation. The first determination module may be further configured to determine whether the number count of retries that have been executed for the target operation reaches a count threshold and/or whether the predetermined sleep time reaches a time threshold. The first determination module may be further configured to determine that the retry is allowed for the target operation in response to determining that the number count of retries that have been executed for the target operation does not reach the count threshold or the predetermined sleep time does not reach the time threshold.

In some embodiments, the system may further include an obtaining module. The obtaining module may be configured to obtain at least one target operation parameter and obtain the target operation based on the at least one target operation parameter.

In some embodiments, the target operation may include at least one of accessing a database, reading or writing a file, and/or initiating a remote call.

In some embodiments, the target operation may be associated with an operating function included in the retry proxy component.

A still further aspect of the present disclosure relates to a non-transitory computer readable medium including executable instructions. When the executable instructions are executed by at least one processor, the executable instructions may direct the at least one processor to perform a method. The method may include determining whether a retry is allowed for a target operation based on a retry strategy included in a retry proxy component; in response to determining that the retry is allowed for the target operation, executing the target operation; detecting whether there is an exception associated with the execution of the target operation; in response to determining that there is the exception associated with the execution of the target operation, determining whether a retry is needed for the target operation based on the retry strategy; and in response to determining that the retry is unneeded for the target operation, stopping the target operation.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
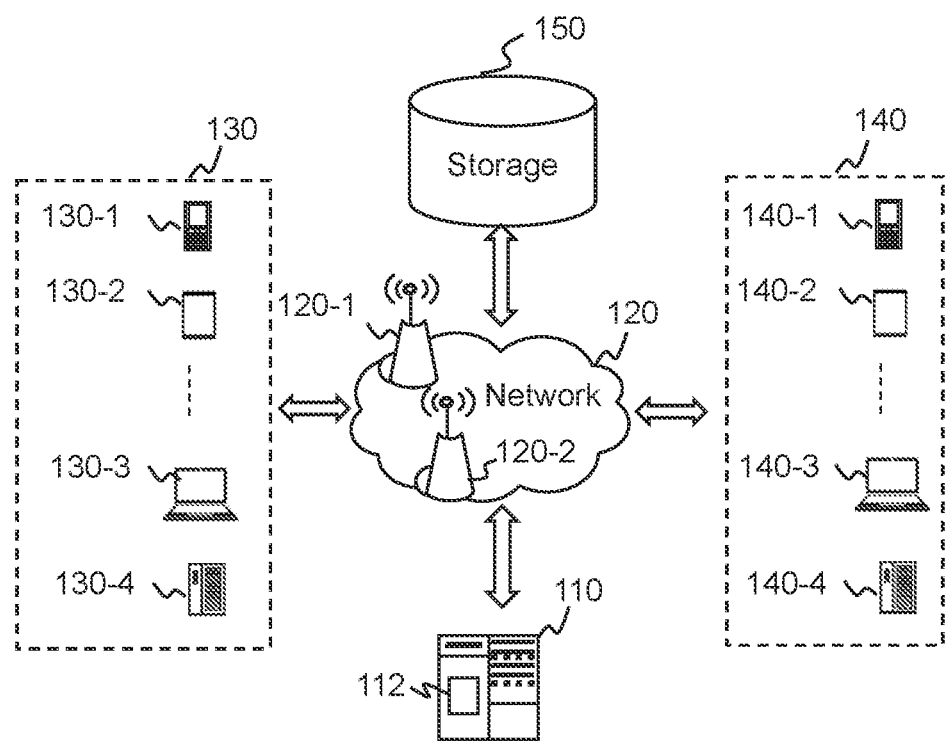
FIG. 1 is a schematic diagram illustrating an exemplary online to offline service system according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this disclosure, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operations and functions of the related elements of structure and the combination of parts and economies of manufacture, may become more apparent upon consideration of the following description with reference to the accompanying drawings, all of which form part of this disclosure. It is to be expressly understood, however, that the drawings are for the purpose of illustration and description only and are not intended to Omit the scope of the present disclosure. It is understood that the drawings are not to scale.

The flowcharts used in the present disclosure illustrate operations that systems implement according to some embodiments of the present disclosure. It is to be expressly understood, the operations of the flowcharts may be implemented not in order. Conversely, the operations may be implemented in inverted order, or simultaneously. Moreover, one or more other operations may be added to the flowcharts. One or more operations may be removed from the flowcharts.

An aspect of the present disclosure relates to systems and methods for operation retry. The systems may determine whether a retry is allowed for the target operation (e.g. accessing a database, reading or writing a file, initiating a remote call) based on a retry strategy included in a retry proxy component. The systems may execute the target operation in response to determining that the retry is allowed for the target operation. The systems may detect whether there is an exception (e.g. an exception caused by a network anomaly) associated with the execution of the target operation. The systems may also determine whether a retry is needed for the target operation based on the retry strategy in response to determining that there is the exception associated with the execution of the target operation. Further, the systems may stop the target operation in response to determining that the retry is unneeded for the target operation. According to the systems and methods of the present disclosure, when designing the retry proxy component, the target operation may be joined into an operating function and correlated with the retry strategy. Therefore, whether a retry is allowed and/or needed for the target operation can be determined efficiently, thereby improving reducing system pressure and improving system efficiency.

FIG. 1 is a schematic diagram illustrating an exemplary online to offline service system according to some embodiments of the present disclosure. In some embodiments, the online to offline service system 100 may include a server 110, a network 120, a requester terminal 130, a provider terminal 140, and a storage 150.

In some embodiments, the server 110 may be a single server or a server group. The server group may be centralized or distributed (e.g., the server 110 may be a distributed system). In some embodiments, the server 110 may be local or remote. For example, the server 110 may access information and/or data stored in the requester terminal 130, the provider terminal 140, and/or the storage 150 via the network 120. As another example, the server 110 may be directly connected to the requester terminal 130, the provider terminal 140, and/or the storage 150 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 including one or more components illustrated in FIG. 2 in the present disclosure.

In some embodiments, the server 110 may include a processing engine 112. The processing engine 112 may process information and/or data associated with operation retry to perform one or more functions described in the present disclosure. For example, the processing engine 112 may determine whether a retry is allowed for a target operation based on a retry strategy included in a retry proxy component. In some embodiments, the processing engine 112 may include one or more processing engines (e.g., single-core processing engine(s) or multi-core processor(s)). Merely by way of example, the processing engine 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLO), a controller, a micro-controller unit, a reduced instruction-set computer (RISC), a microprocessor, or the like, or any combination thereof.

The network 120 may facilitate exchange of information and/or data. In some embodiments, one or more components (e.g., the server 110, the requester terminal 130, the provider terminal 140, or the storage 150) of the online to offline service system 100 may transmit information and/or data to other component(s) of the online to offline service system 100 via the network 120. For example, the server 110 may transmit a request for obtaining user information to the storage 150 via the network 120. In some embodiments, the network 120 may be any type of wired or wireless network, or combination thereof. Merely by way of example, the network 120 may include a cable network, a wireline network, an optical fiber network, a tele communications network, an intranet, an Internet, a local area network (LAN), a wide area network (WAN), a wireless local area network (WLAN), a metropolitan area network (MAN), a public telephone switched network (PSTN), a Bluetooth network, a ZigBee network, a near field communication (NFC) network, or the like, or any combination thereof. In some embodiments, the network 120 may include one or more network access points. For example, the network 120 may include wired or wireless network access points, through which one or more components of the online to offline service system 100 may be connected to the network 120 to exchange data and/or information.

In some embodiments, a requester may be a user of the requester terminal 130. In some embodiments, the user of the requester terminal 130 may be someone other than the requester. For example, a user A of the requester terminal 130 may use the requester terminal 130 to send a service request for a user B, or receive service and/or information or instructions from the server 110. In some embodiments, a provider may be a user of the provider terminal 140. In some embodiments, the user of the provider terminal 140 may be someone other than the provider. For example, a user C of the provider terminal 140 may user the provider terminal 140 to receive a service request for a user D, and/or information or instructions from the server 110. In some embodiments, "requester" and "requester terminal" may be used interchangeably, and "provider" and "provider terminal" may be used interchangeably.

In some embodiments, the requester terminal 130 may include a mobile device 130-1, a tablet computer 130-2, a laptop computer 130-3, a built-in device in a motor vehicle 130-4, or the like, or any combination thereof. In some embodiments, the mobile device 130-1 may include a smart home device, a wearable device, a mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a smart bracelet, a smart footgear, a smart glass, a smart helmet, a smart watch, a smart clothing, a smart backpack, a smart accessory, or the like, or any combination thereof. In some embodiments, the mobile device may include a mobile phone, a personal digital assistance (PDA), a gaming device, a navigation device, a point of sale (POS) device, a laptop, a desktop, or the like, or any combination thereof. In some embodiments, the virtual reality device and/or the augmented reality device may include a virtual reality helmet, a virtual reality glass, a virtual reality patch, an augmented reality helmet, augmented reality glasses, an augmented reality patch, or the like, or any combination thereof. For example, the virtual reality device and/or the augmented reality device may include a Google Glass™, an Oculus Rift™, a Hololens™, a Gear VR™, etc. In some embodiments, a built-in device in the motor vehicle 130-4 may include an onboard computer, an onboard television, etc. In some embodiments, the requester terminal 130 may be a device with positioning technology for locating the position of the requester and/or the requester terminal 130.

In some embodiments, the provider terminal 140 may be similar to, or the same device as the requester terminal 130. In some embodiments, the provider terminal 140 may be a device with positioning technology for locating the location of the service provider and/or the provider terminal 140. In some embodiments, the requester terminal 130 and/or the provider terminal 140 may communicate with other positioning device to determine the location of the service requester, the requester terminal 130, the service provider, and/or the provider terminal 140. In some embodiments, the requester terminal 130 and/or the provider terminal 140 may send positioning information to the server 110.

The storage 150 may store data and/or instructions. In some embodiments, the storage 150 may store data obtained from the requester terminal 130 and/or the provider terminal 140. In some embodiments, the storage 150 may store data and/or instructions that the server 110 may execute or use to perform exemplary methods described in the present disclosure, In some embodiments, storage 150 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyrisor RAM (T-RAM), and a zero-capacitor RAM (Z-RAM), etc. Exemplary ROM may include a mask ROM (MROM), a programmable ROM (PROM), an erasable programmable ROM (EPROM), an electrically-erasable programmable ROM (EEPROM), a compact disk ROM (CD-ROM), and a digital versatile disk ROM, etc. In some embodiments, the storage 150 may be implemented on a cloud platform. Merely by way of example, the cloud platform may include a private cloud, a public cloud, a hybrid cloud, a community cloud, a distributed cloud, an inter-cloud, a multi-cloud, or the Ike, or any combination thereof.

In some embodiments, the storage 150 may be connected to the network 120 to communicate with one or more components (e.g., the server 110, the requester terminal 130, and the provider terminal 140) of the online to offline service system 100. One or more components of the online to offline service system 100 may access the data or instructions stored in the storage 150 via the network 120. In some embodiments, the storage 150 may be directly connected to or communicate with one or more components (e.g., the server 110, the requester terminal 130, the provider terminal 140) of the online to offline service system 100. In some embodiments, the storage 150 may be part of the server 110.

In some embodiments, one or more components (e.g., the server 110, the requester terminal 130, the provider terminal 140) of the online to offline service system 100 may access the storage 150. In some embodiments, one or more components of the online to offline service system 100 may read and/or modify information relating to the requester, the provider, and/or the public when one or more conditions are met. For example, the server 110 may read and/or modify one or more users' information after a service is completed. As another example, the provider terminal 140 may access information relating to the requester when receiving a service request from the requester terminal 130, but the provider terminal 140 can not modify the relevant information of the requester.

In some embodiments, information exchanging of one or more components of the online to offline service system 100 may be achieved by way of requesting a service. The object of the service request may be any product. In some embodiments, the product may be a tangible product or immaterial product. The tangible product may include food, medicine, commodity, chemical product, electrical appliance, clothing, car, housing, luxury, or the like, or any combination thereof. The immaterial product may include a servicing product, a financial product, a knowledge product, an internet product, or the like, or any combination thereof. The internet product may include an individual host product, a web product, a mobile internet product, a commercial host product, an embedded product, or the like, or any combination thereof. The mobile internet product may be used in a software of a mobile terminal, a program, a system, or the like, or any combination thereof. The mobile terminal may include a tablet computer, a laptop computer, a mobile phone, a personal digital assistance (PDA), a smart watch, a point of sale (POS) device, an onboard computer, an onboard television, a wearable device, or the like, or any combination thereof. For example, the product may be any software and/or application used on the computer or mobile phone. The software and/or application may relate to shopping, transporting, entertainment, learning, investment, or the like, or any combination thereof. In some embodiments, the software and/or application relating to transporting may include a traveling software and/or application, a vehicle scheduling software and/or application, a mapping software and/or application, etc. In the vehicle scheduling software and/or application, the vehicle may include a horse, a carriage, a rickshaw (e.g., a wheelbarrow, a bike, a tricycle), a car (e.g., a taxi, a bus, a private car), a train, a subway, a vessel, an aircraft (e.g., an airplane, a helicopter, a space shuttle, a rocket, a hot-air balloon), or the like, or any combination thereof.

It should be noted that application scenario illustrated in FIG. 1 is merely provided for the purposes of illustration, and is not intended to limit the scope of the present disclosure. For persons having ordinary skills in the art, multiple variations or modifications may be made under the teachings of the present disclosure. However, those variations and modifications do not depart from the scope of the present disclosure. For example, the online to offline service system 100 may be a data processing system which may be implemented by the server 110. The data processing system may execute a target operation to process various information based on user requests and/or determine whether a retry is allowed and/or needed for the target operation when the target operation is not executed successfully according to the methods disclosed in the present disclosure.

Figure 2:
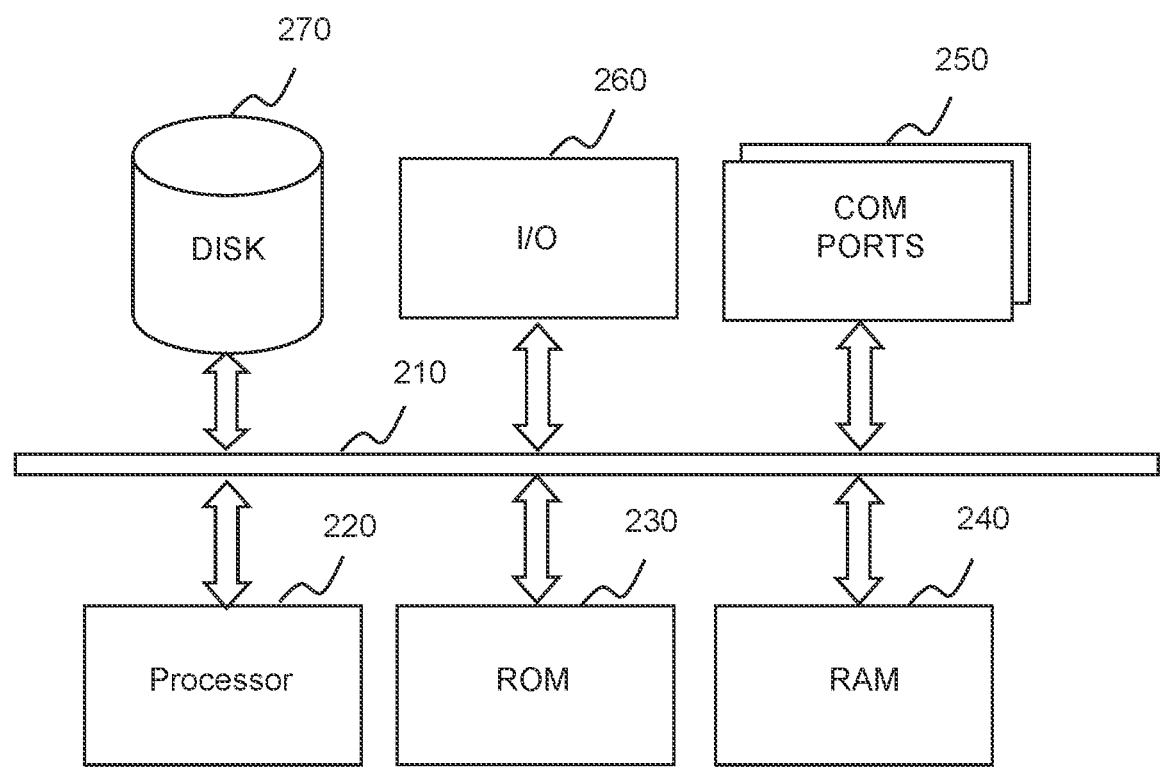
FIG. 2 is a schematic diagram illustrating exemplary hardware and/or software components of an exemplary computing device according to some embodiments of the present disclosure.

FIG. 2 is a schematic diagram illustrating exemplary hardware and/or software components of an exemplary computing device according to some embodiments of the present disclosure. In some embodiments, the server 110 may be implemented on the computing device 200. For example, the processing engine 112 may be implemented on the computing device 200 and configured to perform functions of the processing engine 112 disclosed in this disclosure.

The computing device 200 may be used to implement any component of the online to offline service system 100 of the present disclosure. For example, the processing engine 112 of the online to offline service system 100 may be implemented on the computing device 200, via its hardware, software program, firmware, or a combination thereof. Although only one such computer is shown for convenience, the computer functions related to the online to offline service system 100 as described herein may be implemented in a distributed manner on a number of similar platforms to distribute the processing load.

The computing device 200, for example, may include communication (COM) ports 250 connected to and from a network (e.g., the network 120) connected thereto to facilitate data communications. The computing device 200 may also include a processor (e.g., a processor 220), in the form of one or more processors (e.g., logic circuits), for executing program instructions. For example, the processor may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus 210.

The computing device 200 may further include program storage and data storage of different forms, for example, a disk 270, and a read only memory (ROM) 230, or a random access memory (RAM) 240, for storing various data files to be processed and/or transmitted by the computing device 200. The computing device 200 may also include program instructions stored in the ROM 230, the RAM 240, and/or other type of non-transitory storage medium to be executed by the processor 220. The methods and/or processes of the present disclosure may be implemented as the program instructions. The computing device 200 also includes an I/O component 260, supporting input/output between the computing device 200 and other components therein. The computing device 200 may also receive programming and data via network communications.

Merely for illustration, only one processor is described in FIG. 2. Multiple processors are also contemplated, thus operations and/or method steps performed by one processor as described in the present disclosure may also be jointly or separately performed by the multiple processors. For example, if in the present disclosure the processor of the computing device 200 executes both step A and step B, it should be understood that step A and step B may also be performed by two different CPUs and/or processors jointly or separately in the computing device 200 (e.g., the first processor executes step A and the second processor executes step B, or the first and second processors jointly execute steps A and B).

Figure 3:
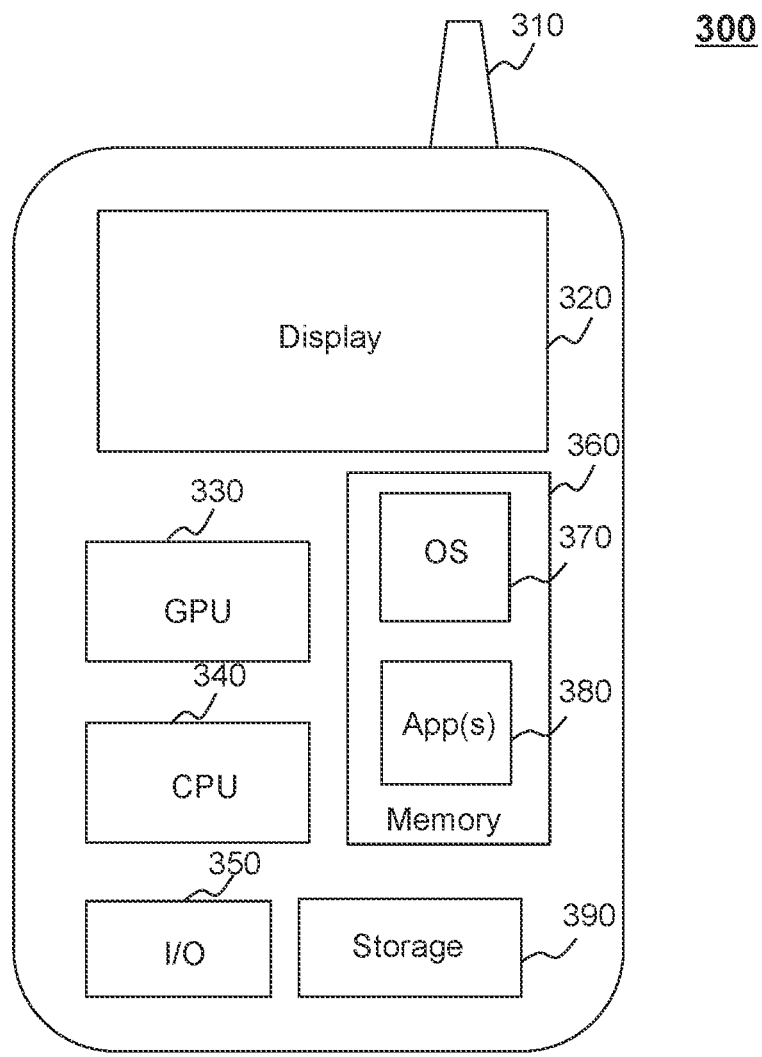
FIG. 3 is a schematic diagram illustrating exemplary hardware and/or software components of an exemplary mobile device according to some embodiments of the present disclosure.

FIG. 3 is a schematic diagram illustrating exemplary hardware and/or software components of an exemplary mobile device according to some embodiments of the present disclosure. In some embodiments, the requester terminal 130 and/or the provider 140 may be implemented on the mobile device 300.

As illustrated in FIG. 3, the mobile device 300 may include a communication platform 310, a display 320, a graphic processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300. In some embodiments, a mobile operating system 370 (e.g., iOS™, Android™, Windows Phone™) and one or more applications 380 may be loaded into the memory 360 from the storage 390 in order to be executed by the CPU 340. The applications 380 may include a browser or any other suitable mobile apps for receiving and rendering information relating to the online to offline service system 100. User interactions with the information stream may be achieved via the I/O 350 and provided to one or more components of the online to offline service system 100 via the network 120.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

Figure 4:
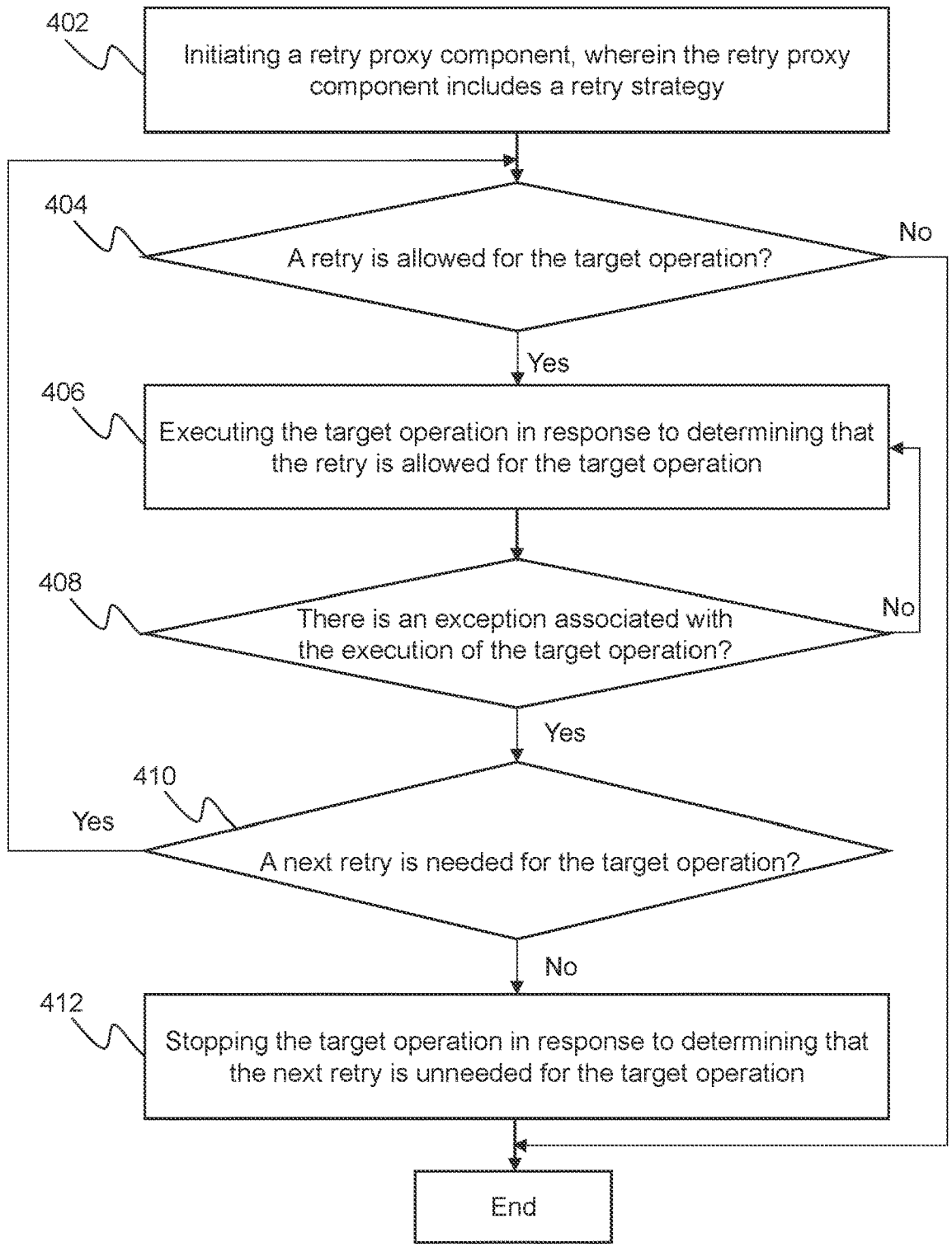
FIG. 4 is a flowchart illustrating an exemplary process for operation retry according to some embodiments of the present disclosure.

FIG. 4 is a flowchart illustrating an exemplary process for operation retry according to some embodiments of the present disclosure. The process 400 may be executed by the online to offline service system 100. For example, the process 400 may be implemented as a set of instructions stored in the storage ROM 230 or RAM 240. The processor 220 and/or the modules in FIGS. 9-11 may execute the set of instructions, and when executing the instructions, the processor 220 and/or the modules may be configured to perform the process 400. The operations of the illustrated process presented below are intended to be illustrative. In some embodiments, the process 400 may be accomplished with one or more additional operations not described and/or without one or more of the operations discussed. Additionally, the order in which the operations of the process 400 illustrated in FIG. 4 and described below is not intended to be limiting.

In 402, a retry proxy component may be initiated, wherein the retry proxy component may include a retry strategy.

In 404, whether a retry is allowed for a target operation may be determined based on the retry strategy.

In 406, in response to determining that the retry is allowed for the target operation, the target operation may be executed (also can be considered as "the retry may be executed for the target operation").

In 408, whether there is an exception associated with the execution of the target operation may be determined.

In 410, in response to determining that there is the exception associated with the execution of the target operation, whether a next retry is needed for the target operation may be determined based on the retry strategy; in response to determining that the next retry is needed for the target operation, the process 400 may be returned to operation 404.

In 412, in response to determining that the next retry is unneeded for the target operation, the target operation may be stopped.

According to the operation retry method provided in some embodiments of the present disclosure, the retry proxy component may refer to a method or a function which is obtained by packaging and transforming a series of multi-method calls or multi-function calls, which includes a retry strategy (a condition under which a retry may be executed). The retry proxy component may be initiated and whether an xth (x=1, 2, 3, . . . ) retry is allowed for a target operation may be determined based on the retry strategy. The target operation may be executed in response to determining that the xth retry is allowed for the target operation. The target operation may include, for example, accessing a database, reading or writing a file, initiating a remote call, etc. When designing the retry proxy component, the target operation may be joined into an operating function and correlated with the retry strategy. The operating function may include a callable function, which can return a result or provide a feedback associated with an exception associated with an execution of an operation, thereby making the code much simpler and more elegant. Further, whether there is an exception associated with the execution of the target operation may be determined. In response to determining that there is the exception associated with the execution of the target operation, whether a (x+1)th retry is needed for the target operation may be determined based on the retry strategy. In response to determining that the (x+1)th retry is needed for the target operation, whether the (x+1)th retry is allowed for the target operation may be determined; in response to determining that the (x+1)th retry is unneeded for the target operation, the target operation may be stopped, that is, some operations for which no retry is needed are defined. According to some embodiments of the present disclosure, whether a retry is needed (or allowed) may be determined based on the retry proxy component and the target operation may be executed based on the retry proxy component, which can decouple business codes and retry codes, make the codes more elegant, and provide a plurality of retry strategies to accurately determine whether a retry is needed for an operation.

In some embodiments, the retry proxy component may be initiated manually or automatically. For example, when a request for accessing a remote server to obtain user information (e.g., requester information, provider information) is initiated, the request may fail due to network reasons, thus it is needed to initiate multiple network requests. In this situation, the retry proxy component may be automatically initiated.

Figure 5:
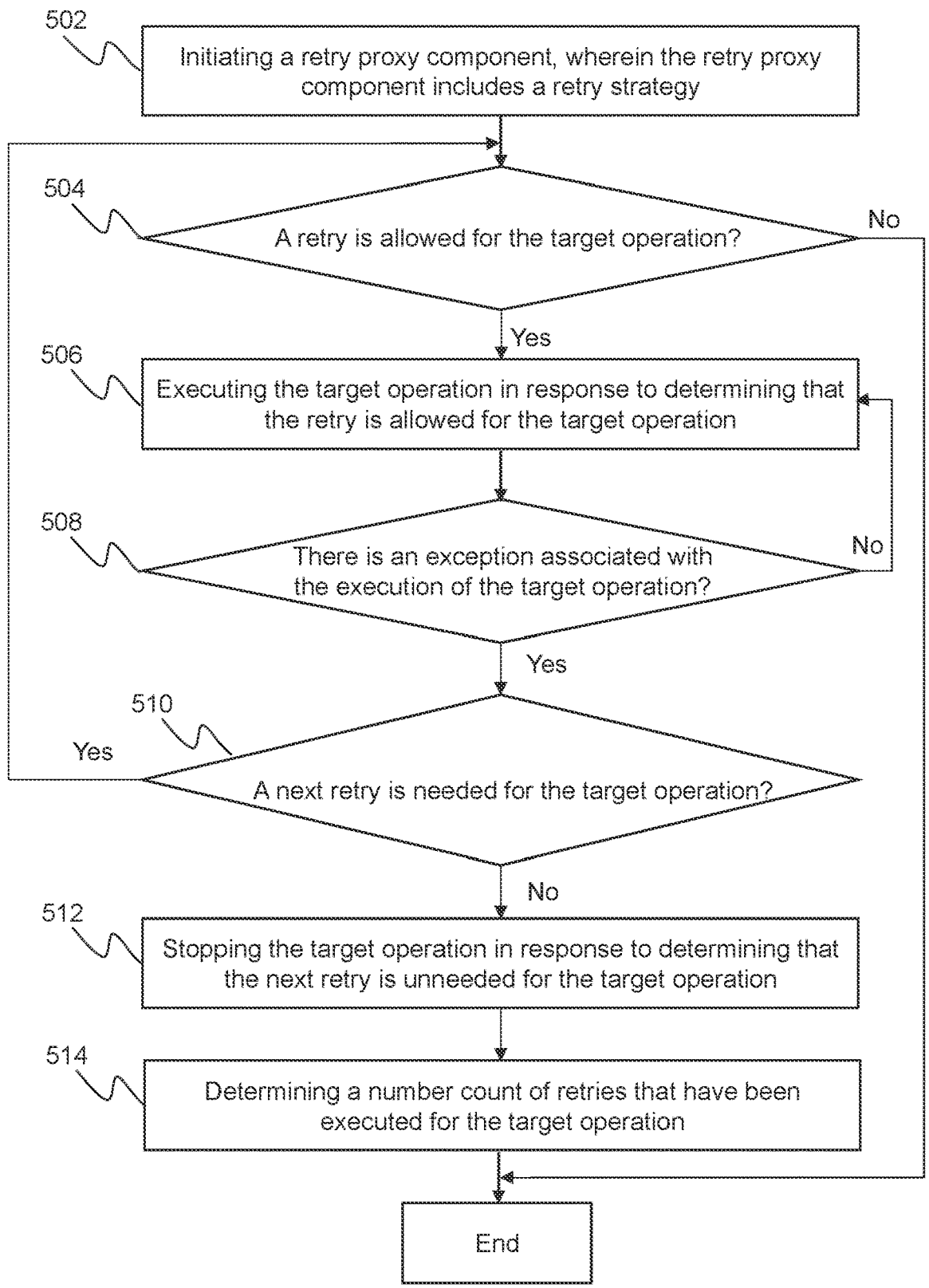
FIG. 5 is a flowchart illustrating an exemplary process for operation retry according to some embodiments of the present disclosure.

FIG. 5 is a flowchart illustrating an exemplary process for operation retry according to some embodiments of the present disclosure. The process 500 may be executed by the online to offline service system 100. For example, the process 500 may be implemented as a set of instructions stored in the storage ROM 230 or RAM 240. The processor 220 and/or the modules in FIGS. 9-11 may execute the set of instructions, and when executing the instructions, the processor 220 and/or the modules may be configured to perform the process 500. The operations of the illustrated process presented below are intended to be illustrative. In some embodiments, the process 500 may be accomplished with one or more additional operations not described and/or without one or more of the operations discussed. Additionally, the order in which the operations of the process 500 illustrated in FIG. 5 and described below is not intended to be limiting.

In 502, a retry proxy component may be initiated, wherein the retry proxy component may include a retry strategy.

In 504, whether a retry is allowed for a target operation may be determined based on the retry strategy.

In 506, in response to determining that the retry is allowed for the target operation, the target operation may be executed.

In 508, whether there is an exception associated with the execution of the target operation may be determined.

In 510, in response to determining that there is the exception associated with the execution of the target operation, whether a next retry is needed for the target operation may be determined based on the retry strategy; in response to determining that the next retry is needed for the target operation, the process 500 may be returned to operation 504.

In 512, in response to determining that the next retry is unneeded for the target operation, the target operation may be stopped.

In 514, a number count of "determining whether a retry is allowed for the target operation" (or a number count of retries that have been executed for the target operation) may be determined.

In some embodiments, a counting may be performed when whether a retry is allowed for the target operation is determined. The number count of retries may be determined, which can provide a reference for subsequent determination(s) that whether a retry is allowed for the target operation.

Figure 6:
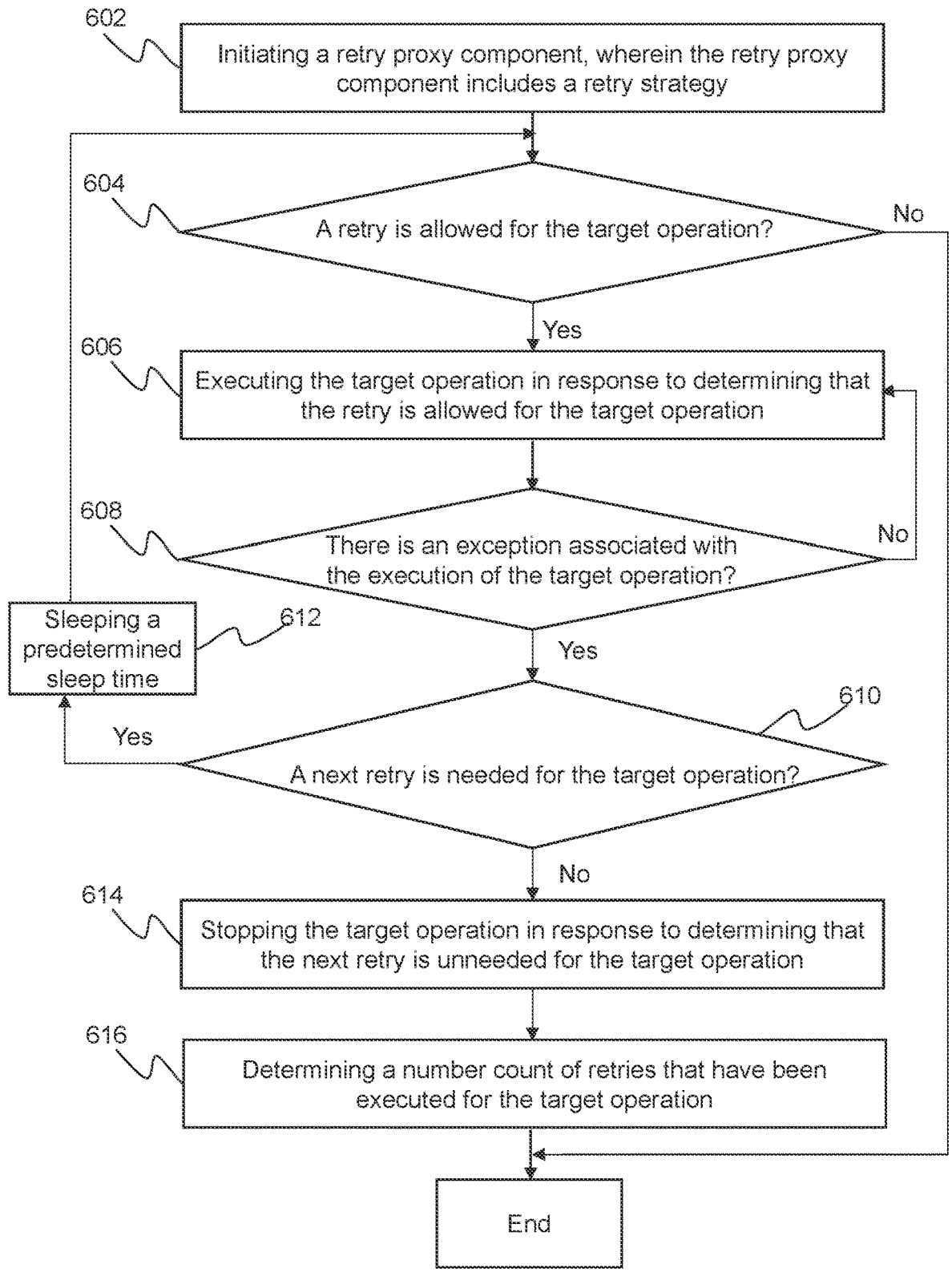
FIG. 6 is a flowchart illustrating an exemplary process for operation retry according to some embodiments of the present disclosure.

FIG. 6 is a flowchart illustrating an exemplary process for operation retry according to some embodiments of the present disclosure. The process 600 may be executed by the online to offline service system 100. For example, the process 600 may be implemented as a set of instructions stored in the storage ROM 230 or RAM 240. The processor 220 and/or the modules in FIGS. 9-11 may execute the set of instructions, and when executing the instructions, the processor 220 and/or the modules may be configured to perform the process 600. The operations of the illustrated process presented below are intended to be illustrative. In some embodiments, the process 600 may be accomplished with one or more additional operations not described and/or without one or more of the operations discussed. Additionally, the order in which the operations of the process 600 illustrated in FIG. 6 and described below is not intended to be limiting.

In 602, a retry proxy component may be initiated, wherein the retry proxy component may include a retry strategy.

In 604, whether a retry is allowed for a target operation may be determined based on the retry strategy.

In 606, in response to determining that the retry is allowed for the target operation, the target operation may be executed.

In 608, whether there is an exception associated with the execution of the target operation may be determined.

In 610, in response to determining that there is the exception associated with the execution of the target operation, whether a next retry is needed for the target operation may be determined based on the retry strategy.

In 612, in response to determining that the next retry is needed for the target operation, the execution of the target operation may be suspended (or referred to as "slept") for a predetermined sleep time. After the execution of the target operation is slept for the predetermined sleep time, the process 600 may be returned to operation 604. In some embodiments, the predetermined sleep time may be expressed as formula (1) below:

$$T_i = N \times i + T_{i-1} \tag{1}$$

where i refers to the number count of "determining whether a retry is allowed for the target operation," which is a positive integer, $T_0 = 0$, and N refers to a predetermined time.

In 614, in response to determining that the next retry is unneeded for the target operation, the target operation may be stopped.

In 616, a number count of "determining whether a retry is allowed for the target operation" (or a number count of retries that have been executed for the target operation) may be determined.

In some embodiments, in response to determining that the (x+1)th retry is needed for the target operation, a predetermined sleep time may be set before whether the (x+1)th retry is allowed for a target operation is determined. In some embodiments, the predetermined sleep time may increase sequentially. For example, according to a default strategy, a first sleep time (which refers to a sleep time between a first retry and a second retry) may be 10 ms and subsequent sleep times may be determined by adding i×10 ms (e.g., a sleep time between the second retry and a third retry may be 20 ms). The sleep time is set to protect backend services and avoid failure of the backend services due to a sudden increase of concurrence caused by retries.

Figure 7:
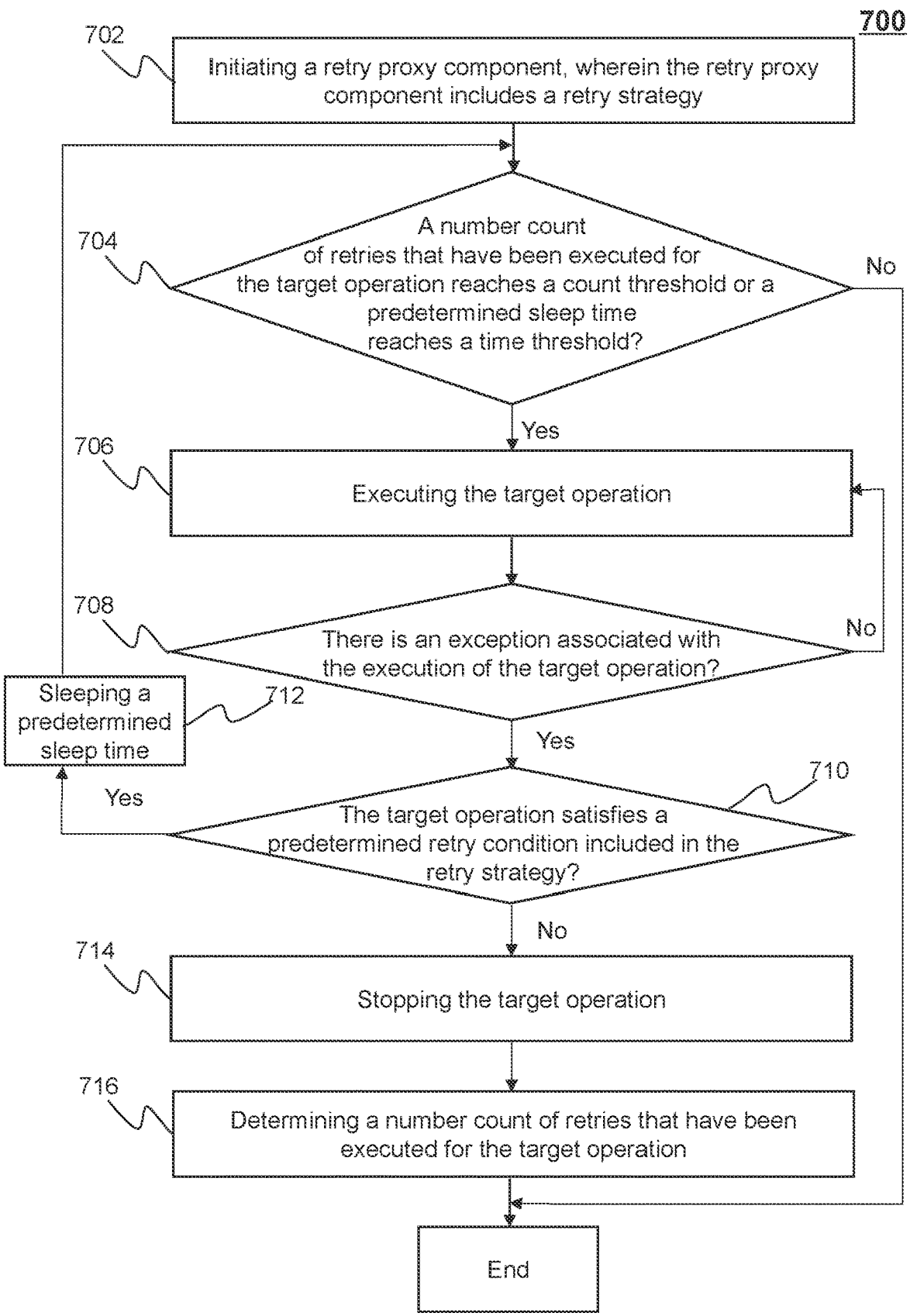
FIG. 7 is a flowchart illustrating an exemplary process for operation retry according to some embodiments of the present disclosure.

FIG. 7 is a flowchart illustrating an exemplary process for operation retry according to some embodiments of the present disclosure. The process 700 may be executed by the online to offline service system 100. For example, the process 700 may be implemented as a set of instructions stored in the storage ROM 230 or RAM 240. The processor 220 and/or the modules in FIGS. 9-11 may execute the set of instructions, and when executing the instructions, the processor 220 and/or the modules may be configured to perform the process 700, The operations of the illustrated process presented below are intended to be illustrative. In some embodiments, the process 700 may be accomplished with one or more additional operations not described and/or without one or more of the operations discussed. Additionally, the order in which the operations of the process 700 illustrated in FIG. 7 and described below is not intended to be limiting.

In 702, a retry proxy component may be initiated, wherein the retry proxy component may include a retry strategy.

In 704, whether a number count of retries reaches a predetermined count threshold and/or whether a predetermined sleep time reaches a predetermined time threshold may be determined.

In 706, in response to determining that the number count of retries does not reach the predetermined count threshold and/or the predetermined sleep time does not reach the predetermined time threshold, the target operation may be executed (i.e., a retry is allowed for the target operation").

In 708, whether there is an exception associated with the execution of the target operation may be determined.

In 710, in response to determining that there is the exception associated with the execution of the target operation, whether the target operation satisfies a predetermined retry condition may be determined.

In 712, in response to determining that the target operation does not satisfy the predetermined retry condition (also can be considered as "does not reach or exceed the predetermined retry condition," that is, a next retry is needed for the target operation), the execution of the target operation may be suspended (or referred to as "slept") for a predetermined sleep time. After the execution of the target operation is slept for the predetermined sleep time, the process 700 may be returned to operation 704.

In 714, in response to determining that the next retry is unneeded for the target operation, the target operation may be stopped.

In 716, a number count of "determining whether a retry is allowed for the target operation" (or a number count of retries that have been executed for the target operation) may be determined.

In some embodiments, the retry strategy may include whether a number count of retries reaches a predetermined count threshold and/or whether a predetermined sleep time reaches a predetermined time threshold. The retry strategy may also include whether the target operation satisfies a predetermined retry condition. The predetermined sleep time may be expressed as formula (1) above.

In some embodiments, whether a retry is allowed for the target operation may be determined by determining whether a number count of retries reaches a predetermined count threshold and/or whether a predetermined sleep time reaches a predetermined time threshold. The determination may be implemented by executing an allowRetry function. According to the allowRetry function, a plurality of retry preconditions can be determined and a plurality of retry strategies can be provided. Further, whether a retry is allowed for the target operation can be determined based on the plurality of retry strategies. In some embodiments, whether a retry is needed for the target operation may be determined by determining whether the target operation satisfies a predetermined retry condition. The determination may be implemented by executing a takeException function. According to the takeException function, for which exceptions (e.g., an exception caused by network anomaly) a retry is needed may be determined.

In some embodiments, the retry strategy may be an optimal strategy which is verified through strict scenarios. Meanwhile, an entry and parameters associated with the retry strategy are open and a user can customize a personalized retry strategy. If the user intends to customize a personalized retry strategy, the takeException function and the allowRetry function should be enabled and transmitted to the retry proxy component together with the callable function.

Figure 8:
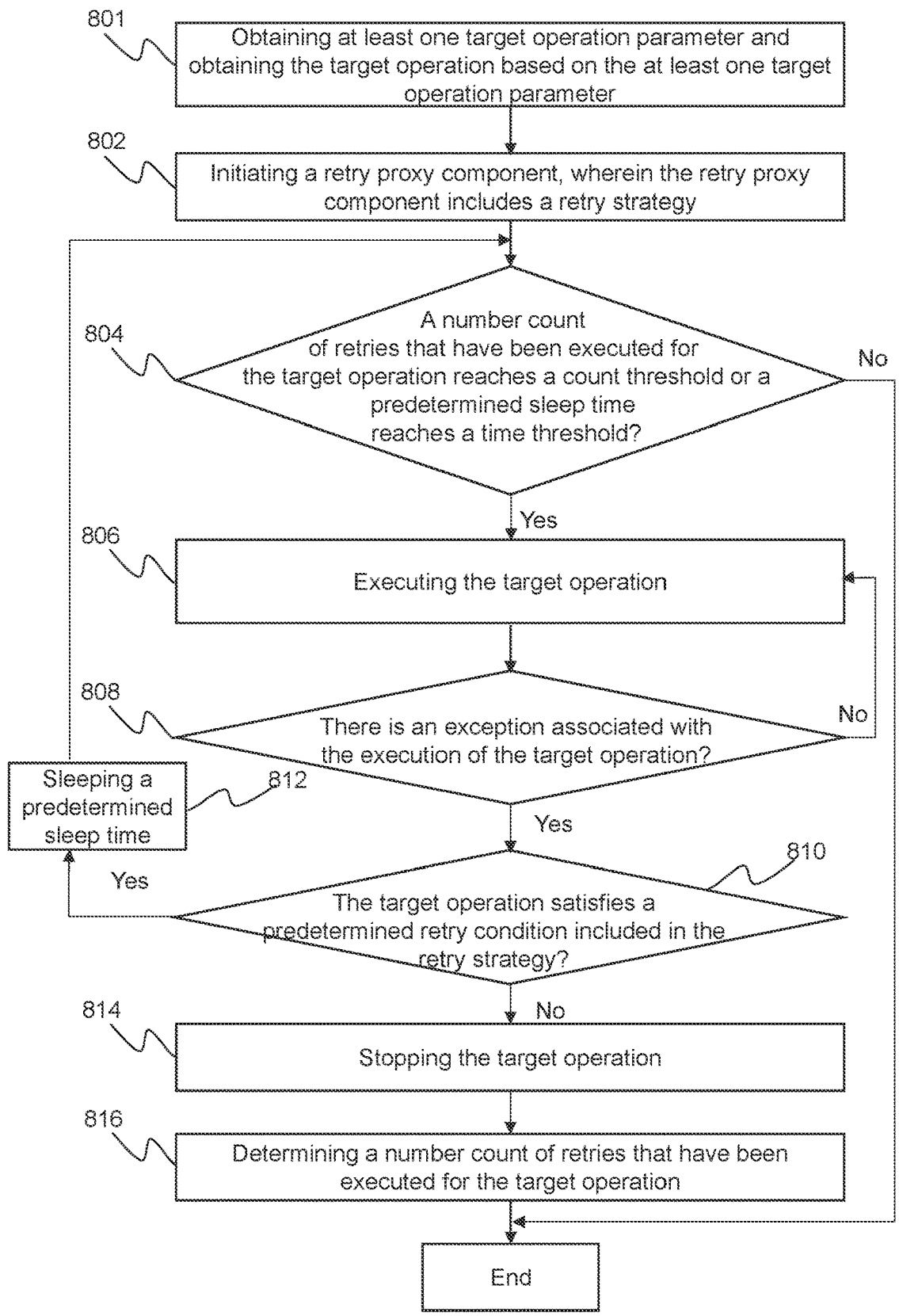
FIG. 8 is a flowchart illustrating an exemplary process for operation retry according to some embodiments of the present disclosure.

FIG. 8 is a flowchart illustrating an exemplary process for operation retry according to some embodiments of the present disclosure. The process 800 may be executed by the online to offline service system 100. For example, the process 800 may be implemented as a set of instructions stored in the storage ROM 230 or RAM 240. The processor 220 and/or the modules in FIGS. 9-11 may execute the set of instructions, and when executing the instructions, the processor 220 and/or the modules may be configured to perform the process 800. The operations of the illustrated process presented below are intended to be illustrative. In some embodiments, the process 800 may be accomplished with one or more additional operations not described and/or without one or more of the operations discussed. Additionally, the order in which the operations of the process 800 illustrated in FIG. 8 and described below is not intended to be limiting.

In 801, at least one target operation parameter may be obtained and a target operation may be obtained based on the at least one target operation parameter.

In 802, a retry proxy component may be initiated, wherein the retry proxy component may include a retry strategy.

In 804, whether a number count of retries reaches a predetermined count threshold and/or whether a predetermined sleep time reaches a predetermined time threshold may be determined.

In 806, in response to determining that the number count of retries does not reach the predetermined count threshold and/or the predetermined sleep time does not reach the predetermined time threshold, the target operation may be executed.

In 808, whether there is an exception associated with the execution of the target operation may be determined.

In 810, in response to determining that there is the exception associated with the execution of the target operation, whether the target operation satisfies a predetermined retry condition may be determined.

In 812, in response to determining that the target operation does not satisfy the predetermined retry condition, the execution of the target operation may be suspended (or referred to as "slept") for a predetermined sleep time. After the execution of the target operation is slept for the predetermined sleep time, the process 800 may be returned to operation 804.

In 814, in response to determining that the next retry is unneeded for the target operation, the target operation may be stopped.

In 816, a number count of "determining whether a retry is allowed for the target operation" (or a number count of retries that have been executed for the target operation) may be determined.

In some embodiments, the retry proxy component may receive at least one target operation parameter packaged by the callable function to obtain the target operation.

Figure 9:
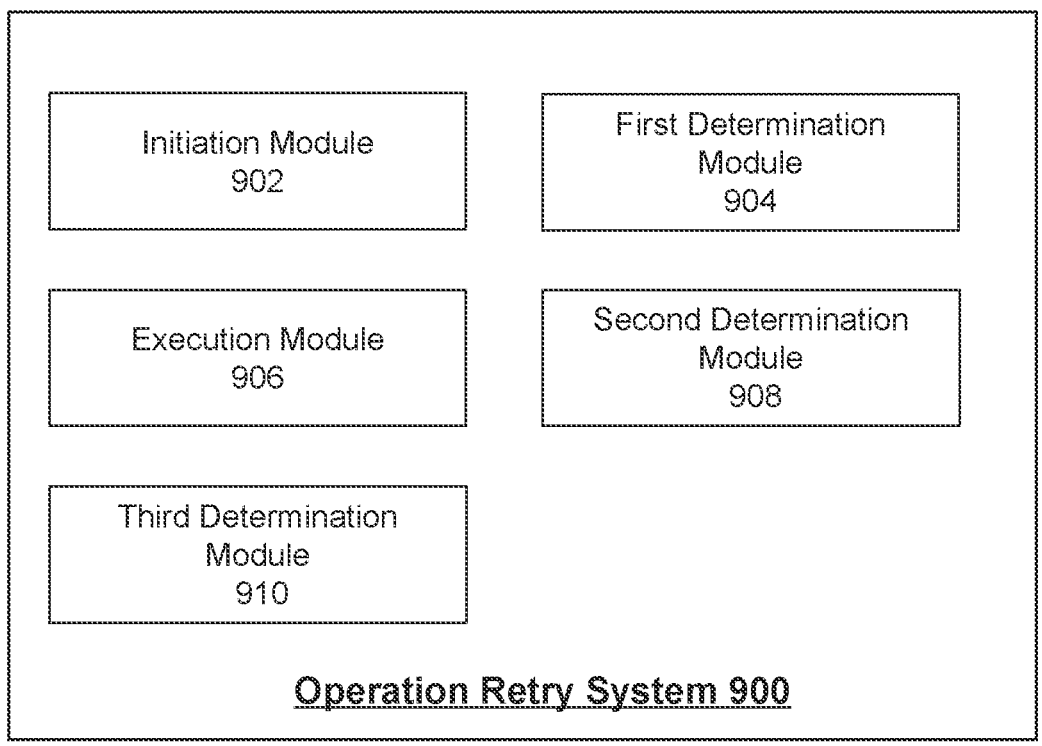
FIG. 9 is a block diagram illustrating an exemplary operation retry system according to an embodiment of the present disclosure.

FIG. 9 is a block diagram illustrating an exemplary operation retry system according to some embodiments of the present disclosure. The operation retry system 900 may include an initiation module 902, a first determination module 904, an execution module 908, a second determination module 908, and a third determination module 910. In some embodiments, the operation retry system 900 may be integrated into the server 110. For example, the operation retry system 900 may be integrated into the processing engine 112.

The initiation module 902 may be configured to initiate a retry proxy component, wherein the retry proxy component may include a retry strategy.

The first determination module 904 may be configured to determine whether a retry is allowed for a target operation based on the retry strategy.

The execution module 906 may be configured to execute the target operation in response to determining that the retry is allowed for the target operation.

The second determination module 908 may be configured to determine whether there is an exception associated with the execution of the target operation.

The third determination module 910 may be configured to determine whether a next retry is needed for the target operation based on the retry strategy in response to determining that there is the exception associated with the execution of the target operation.

The first determination module 904 may be further configured to determine whether the next retry is avowed for the target operation in response to determining that the next retry is needed for the target operation.

The execution module 906 may be configured to stop the target operation in response to determining that the next retry is unneeded for the target operation.

According to the operation retry system 900 provided in some embodiments of the present disclosure, the retry proxy component may refer to a method or a function which is obtained by packaging and transforming a series of multi-method calls or multi-function calls, which includes a retry strategy (a condition under which a retry may be executed). The retry proxy component may be initiated and whether an xth (x=1, 2, 3, . . . ) retry is allowed for a target operation may be determined based on the retry strategy. The target operation may be executed in response to determining that the xth retry is allowed for the target operation. The target operation may include, for example, accessing a database, reading or writing a file, initiating a remote call, etc. When designing the retry proxy component, the target operation may be joined into an operating function and correlated with the retry strategy. The operating function may include a callable function, which can return a result or provide a feedback associated with an exception associated with an execution of an operation, thereby making the code much simpler and more elegant. Further, whether there is an exception associated with the execution of the target operation may be determined. In response to determining that there is the exception associated with the execution of the target operation, whether a (x+1)th retry is needed for the target operation may be determined based on the retry strategy. In response to determining that the (x+1)th retry is needed for the target operation, whether the (x+1)th retry is allowed for the target operation may be determined; in response to determining that the (x+1)th retry is unneeded for the target operation, the target operation may be stopped, that is, some operations for which no retry is needed are defined. According to some embodiments of the present disclosure, whether a retry is needed (or allowed) may be determined based on the retry proxy component and the retry may be executed based on the retry proxy component, which can decouple business codes and retry codes, make the codes more elegant, and provide a plurality of retry strategies to accurately determine whether a retry is needed for an operation.

In some embodiments, the retry proxy component may be initiated manually or automatically. For example, when a request for accessing a remote server to obtain user information (e.g., requester information, provider information) is initiated, the request may fail due to network reasons, thus it is needed to initiate multiple network requests. In this situation, the retry proxy component may be automatically initiated.

Figure 10:
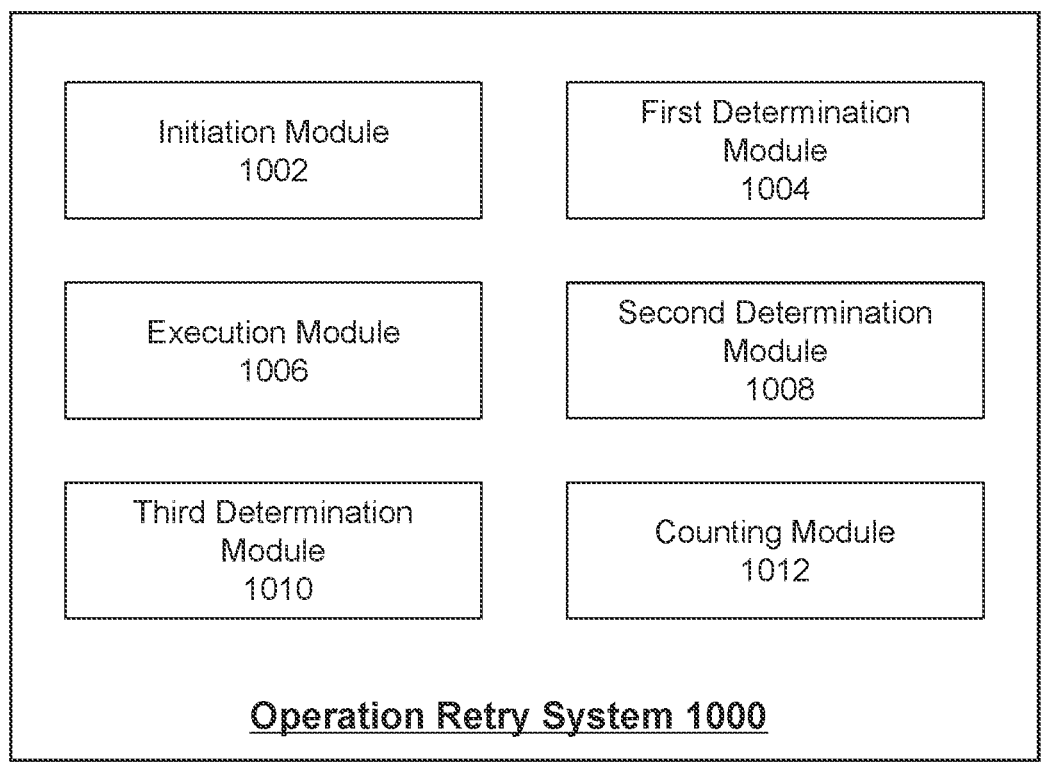
FIG. 10 is a block diagram illustrating an exemplary operation retry system according to an embodiment of the present disclosure.

FIG. 10 is a block diagram illustrating an exemplary operation retry system according to another embodiment of the present disclosure. The operation retry system 1000 may include an initiation module 1002, a first determination module 1004, an execution module 1006, a second determination module 1008, a third determination module 1010, and a counting module 1012. In some embodiments, the operation retry system 1000 may be integrated into the server 110. For example, the operation retry system 1000 may be integrated into the processing engine 112.

The initiation module 1002 may be configured to initiate a retry proxy component, wherein the retry proxy component may include a retry strategy.

The first determination module 1004 may be configured to determine whether a retry is allowed for a target operation based on the retry strategy.

The execution module 1006 may be configured to execute the target operation in response to determining that the retry is allowed for the target operation.

The second determination module 1008 may be configured to determine whether there is an exception associated with the execution of the target operation.

The third determination module 1010 may be configured to determine whether a next retry is needed for the target operation based on the retry strategy in response to determining that there is the exception associated with the execution of the target operation.

The first determination module 1004 may be further configured to determine whether the next retry is allowed for the target operation in response to determining that the next retry is needed for the target operation.

The execution module 1006 may be configured to stop the target operation in response to determining that the next retry is unneeded for the target operation.

The counting module 1012 may be configured to determine a number count of "determining whether a retry is allowed for the target operation" (or a number count of retries that have been executed for the target operation).

In some embodiments, a counting may be performed when whether a retry is allowed for the target operation is determined. The number count of retries may be determined, which can provide a reference for subsequent determination(s) that whether a retry is allowed for the target operation.

In some embodiments, the first determination module 1004 may be specifically configured to suspend (or referred to as "sleep") the execution of the target operation for a predetermined sleep time (which can be expressed as formula (1)) in response to determining that the next retry is needed for the target operation and determine whether the next retry is allowed for the target operation based on the retry strategy after the execution of the target operation is slept for the predetermined sleep time.

In some embodiments, in response to determining that the (x+1)th retry is needed for the target operation, a predetermined sleep time may be set before whether the (x+1)th retry is allowed for a target operation is determined. In some embodiments, the predetermined sleep time may increase sequentially. For example, according to a default strategy, a first sleep time (which refers to a sleep time between a first retry and a second retry) may be 10 ms and subsequent sleep times may be determined by adding i×10 ms (e.g., a sleep time between the second retry and a third retry may be 20 ms). The sleep time is set to protect backend services and avoid failure of the backend services due to a sudden increase of concurrence caused by retries.

In some embodiments, the retry strategy may include whether a number count of retries reaches a predetermined count threshold and/or whether a predetermined sleep time reaches a predetermined time threshold. The first determination module 1004 may be specifically configured to determine whether the number count of retries reaches the predetermined count threshold and/or whether the predetermined sleep time reaches the predetermined time threshold, and determine whether a retry is allowed for the target operation in response to determining that the number count of retries does not reach the predetermined count threshold and/or the predetermined sleep time does not reach the predetermined time threshold.

In some embodiments, whether a retry is allowed for the target operation may be determined by determining whether the number count of retries reaches the predetermined count threshold and/or whether the predetermined sleep time reaches the predetermined time threshold. The determination may be implemented by executing an allowRetry function. According to the allowRetry function, a plurality of retry preconditions can be determined and a plurality of retry strategies can be provided.

In some embodiments, the retry strategy may further include whether the target operation satisfies a predetermined retry condition. The third determination module 1010 may be specifically configured to determine whether the target operation satisfies a predetermined retry condition and determine that a retry is needed for the target operation in response to determining that the target operation does not satisfy the predetermined retry condition.

In some embodiments, whether a retry is needed for the target operation may be determined by determining whether the target operation satisfies a predetermined retry condition. The determination may be implemented by executing a takeException function. According to the takeException function, for which exceptions (e.g., an exception caused by network anomaly) a retry is needed may be determined.

In some embodiments, the retry strategy may be an optimal strategy which is verified through strict scenarios. Meanwhile, an entry and parameters associated with the retry strategy are open and a user can customize a personalized retry strategy. If the user intends to customize a personalized retry strategy, the takeException function and the allowRetry function should be enabled and transmitted to the retry proxy component together with the callable function.

Figure 11:
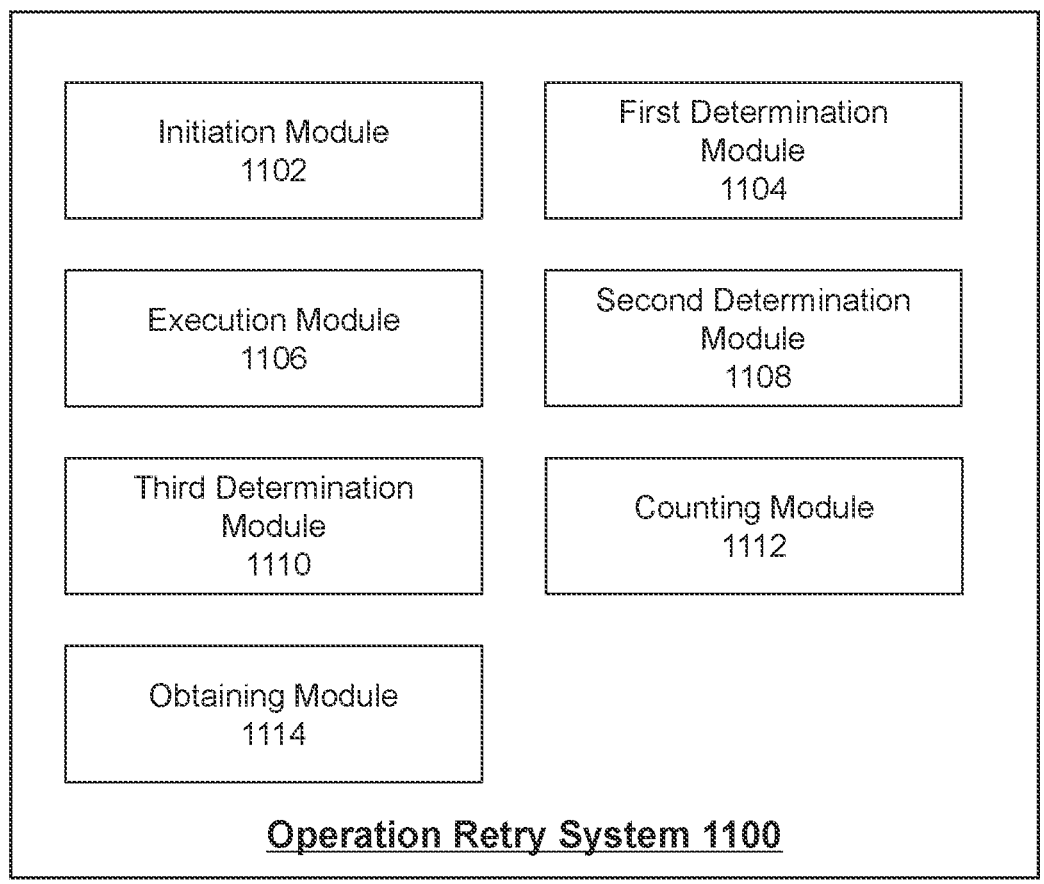
FIG. 11 is a block diagram illustrating an exemplary operation retry system according to an embodiment of the present disclosure.

FIG. 11 is a block diagram illustrating an exemplary operation retry system according to some embodiments of the present disclosure. The operation retry system 1100 may include an initiation module 1102, a first determination module 1104, an execution module 1106, a second determination module 1108, a third determination module 1110, a counting module 1112, and an obtaining module 1114. In some embodiments, the operation retry system 1100 may be integrated into the server 110. For example, the operation retry system 1100 may be integrated into the processing engine 112.

The initiation module 1102 may be configured to initiate a retry proxy component, wherein the retry proxy component may include a retry strategy.

The first determination module 1104 may be configured to determine whether a retry is allowed for a target operation based on the retry strategy.

The execution module 1106 may be configured to execute the target operation in response to determining that the retry is allowed for the target operation.

The second determination module 1108 may be configured to determine whether there is an exception associated with the execution of the target operation.

The third determination module 1110 may be configured to determine whether a next retry is needed for the target operation based on the retry strategy in response to determining that there is the exception associated with the execution of the target operation.

The first determination module 1104 may be further configured to determine whether the next retry is allowed for the target operation in response to determining that the next retry is needed for the target operation.

The execution module 1106 may be configured to stop the target operation in response to determining that the next retry is unneeded for the target operation.

The counting module 1112 may be configured to determine a number count of "determining whether a retry is allowed for the target operation" (or a number count of retries that have been executed for the target operation).

The obtaining module 1114 may be configured to receive at least one target operation parameter before whether a retry is allowed for the target operation is determined based on the retry strategy, and configured to obtain the target operation based on the at least one target operation parameter.

In some embodiments, the retry proxy component may receive at least one target operation parameter packaged by the callable function to obtain the target operation.

Take a transportation service scenario as an example, when a user calls a taxi via a taxi-hailing client, the taxi-hailing client should transmit a taxi-hailing request to the server 110. However, in case of network anomaly (e.g., a WiFi network anomaly, a physical damage of network fibers, a problem associated with a room switch, a network flash break), the request may fail if a prompt "network anomaly" is provided to the user when the request just fails the first time, a bad user experience may be provided to the user because the failure may be caused by a network flash break and only one failure does not mean that the network is always abnormal. Therefore, a retry may be needed for the request. On one hand, a fault-tolerance processing associated with the network flash break can be performed; on the other hand, it may be more accurate to provide the prompt "network anomaly" to the user after multiple failing retries. Therefore, a retry is necessary and requires a certain strategy and a certain rule, such as:

1) A retry interval. A short retry interval may increase server pressure due to frequent retries and may lead to a risk of downtime; whereas, a long retry interval may delay the retry time, which results in that the user has to wait too long time and a network recovery cannot be detected timely. Since the more retry errors are, the higher a probability of network anomaly may be, therefore, the retry interval should be defined as dynamically increasing. According to the allowRetry function, a sleep time may be set and a number count of retries may be controlled.

2) A retry device (a retry proxy component). The retry proxy component is directed to network anomaly (e.g., SocketException, SocketTimeoutException), if the server 110 returns a normal http status "200" which is a non-network anomaly although it does not meet expectation, in this situation, a retry is not needed. According to the takeException function, an exception determination may be performed to determine whether it is network anomaly.

Figure 12:
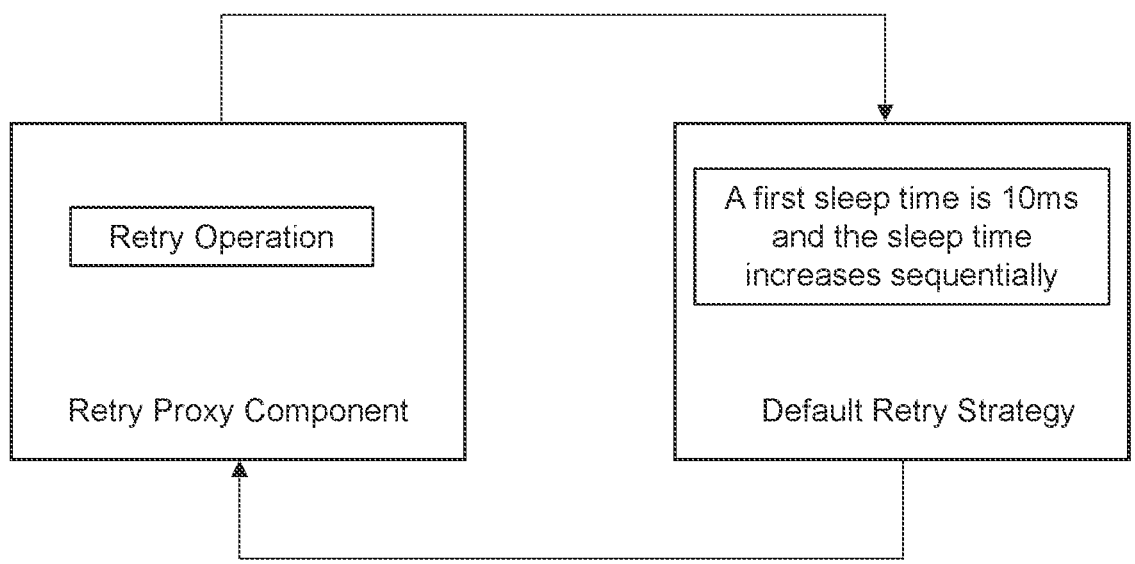
FIG. 12 is a schematic diagram illustrating an exemplary sleep time according to some embodiments of the present disclosure.

FIG. 12 is a schematic diagram illustrating an exemplary sleep time according to some embodiments of the present disclosure. The retry proxy component may obtain the target operation parameter packaged by the callable function and execute the target operation based on a retry strategy. The retry strategy may include determining a retry condition, designating a number count of retries, and controlling a retry interval. According to a default strategy, a first sleep time (which refers to a sleep time between a first retry and a second retry) may be 10 ms and subsequent sleep times may be increased successively.

The present disclosure may also provide a computer storage medium including executable instructions. When executing by at least one processor, the executable instructions may direct the at least one processor to perform a process (e.g., process 400, process 500, process 600, process 700, process 800) described elsewhere in the present disclosure.

Figure 13:
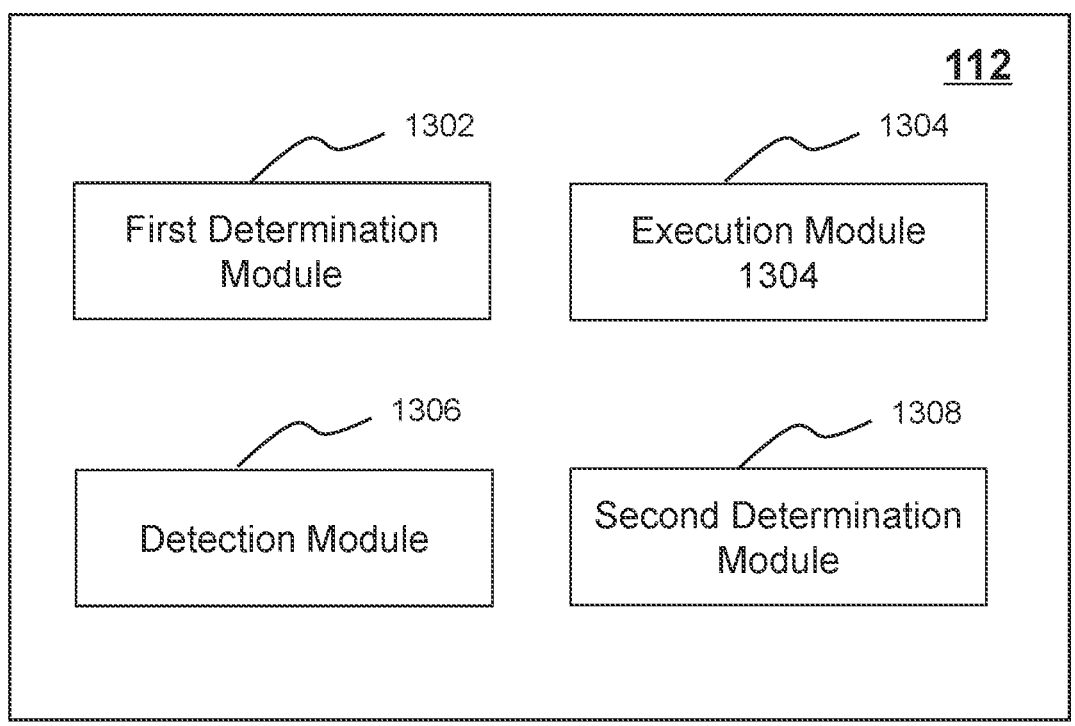
FIG. 13 is a block diagram illustrating an exemplary processing engine according to some embodiments of the present disclosure.

FIG. 13 is a block diagram illustrating an exemplary processing engine according to some embodiments of the present disclosure. The processing engine 112 may include a first determination module 1302, an execution module 1304, a detection module 1306, and a second determination module 1308.

The first determination module 1302 may be configured to determine whether a retry is allowed for the target operation based on a retry strategy included in a retry proxy component. In some embodiments, the first determination module 1302 may determine whether a retry is allowed for the target operation when there is an exception associated with an execution of the target operation (i.e., the target operation is not executed successfully) or when the retry proxy component is initiated. As described in connection with process 700, the determination may be implemented by executing an allowRetry function.

The execution module 1304 may be configured to execute the target operation in response to determining that the retry is allowed for the target operation.

The detection module 1306 may be configured to detect whether there is an exception associated with the execution of the target operation.

The second determination module 1308 may be configured to determine whether a retry (also can be considered as a "next retry") is needed for the target operation based on the retry strategy in response to determining that there is the exception associated with the execution of the target operation.

In some embodiments, as described in connection with operation 710, the second determination module 1308 may determine whether the target operation satisfies a predetermined retry condition included in the retry strategy and determine that the retry is needed for the target operation in response to determining that the target operation does not satisfy the predetermined retry condition.

In some embodiments, in response to determining that the retry is needed for the target operation, the first determination module 1302 may set a predetermined sleep time and determine whether the retry is allowed for the target operation after the predetermined sleep time has passed.

In some embodiments, the retry strategy may include the number count of retries that have been executed for the target operation or the predetermined sleep time set for the retry for the target operation. As described in connection with operation 704, the first determination module 1302 may determine whether the number count of retries that have been executed for the target operation reaches a count threshold or whether the predetermined sleep time reaches a time threshold. In response to determining that the number count of retries that have been executed for the target operation does not reach the count threshold or the predetermined sleep time does not reach the time threshold, the first determination module 1302 may determine that the retry is allowed for the target operation.

In some embodiments, the execution module 1304 may stop the target operation in response to determining that the retry is unneeded for the target operation.

In some embodiments, the processing engine 112 may also include an obtaining module (not shown) which may be configured to obtain at least one target operation parameter (e.g., an operating time, an operand) and obtain the target operation based on the at least one target operation parameter.

In some embodiments, the processing engine 112 may also include an initiation module (not shown) which may be configured to initiate the retry proxy component.

In some embodiments, the processing engine 112 may also include a counting module (not shown) which may be configured to determine the number count of retires that have been executed for the target operation.

The modules in the processing engine 112 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined as a single module, and any one of the modules may be divided into two or more units. For example, the first determination module 1302 and the execution module 1304 may be combined as a single module which may both determine whether a retry is allowed for the target operation and execute the target operation. As another example, the processing engine 112 may include a storage module (not shown in FIG. 13) which may be configured to store the predetermined sleep time, the number count of retries, the retry strategy, the target operation parameter, etc.

Figure 14:
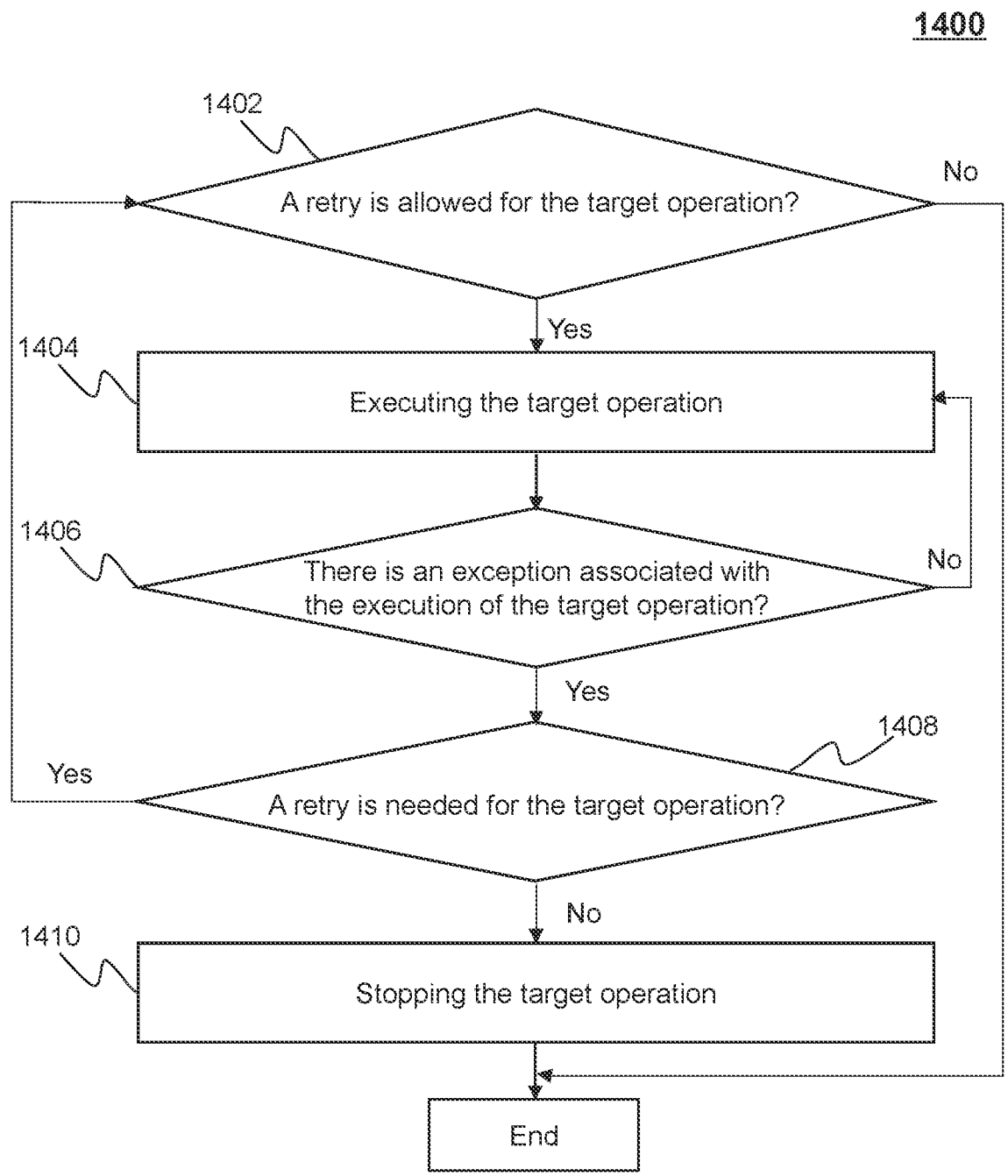
FIG. 14 is a flowchart illustrating an exemplary process for operation retry according to some embodiments of the present disclosure.

FIG. 14 is a flowchart illustrating an exemplary process for operation retry according to some embodiments of the present disclosure. The process 1400 may be executed by the online to offline service system 100. For example, the process 1400 may be implemented as a set of instructions (e.g., an application) stored in the storage ROM 230 or RAM 240. The processor 220 and/or the modules in FIG. 13 may execute the set of instructions, and when executing the instructions, the processor 220 and/or the modules may be configured to perform the process 1400. The operations of the illustrated process/method presented below are intended to be illustrative. In some embodiments, the process 1400 may be accomplished with one or more additional operations not described and/or without one or more of the operations discussed. Additionally, the order in which the operations of the process 1400 illustrated in FIG. 14 and described below is not intended to be limiting.

In 1402, the processing engine 112 (e.g., the first determination module 1302) (e.g., the processing circuits of the processor 220) may determine whether a retry is allowed for the target operation based on a retry strategy included in a retry proxy component. In some embodiments, the processing engine 112 may determine whether a retry is allowed for the target operation when there is an exception associated with an execution of the target operation (i.e., the target operation is not executed successfully) or when the retry proxy component is initiated. As described in connection with process 700, the determination may be implemented by executing an allowRetry function.

In some embodiments, as described in connection with operation 801, the processing engine 112 may obtain at least one target operation parameter (e.g., an operating time, an operand) and obtain the target operation based on the at least one target operation parameter. In some embodiments, the target operation may include accessing a database, reading or writing a file, initiating a remote call, etc. Take an on-demand transportation service scenario as an example, the target operation may include initiating a service request to the server 110, allocating the service request to a provider, accessing a data resource (e.g., the storage 150) to obtain user information (e.g., requester information, provider information) associated with a service request, etc.

In some embodiments, as described in connection with process 400, the retry proxy component may refer to a method or a function which is obtained by packaging and transforming a series of multi-method calls or multi-function calls, which includes a retry strategy (a condition under which a retry may be executed). In some embodiments, the target operation may be associated with an operating function (e.g., a callable function described in FIG. 4) included in the retry proxy component. For example, when designing the retry proxy component, the target operation may be joined into the operating function and correlated with the retry strategy. That is, according to the retry strategy, it can be determined that under which situations a retry is allowed for the target operation.

In some embodiments, the retry proxy component may be initiated manually or may be automatically triggered in response to a predetermined event. For example, as described above, when a request for accessing the server 110 to obtain user information (e.g., requester information, provider information) is initiated, the request may fail due to network reasons, thus it is needed to initiate multiple network requests. In this situation, the retry proxy component may be automatically triggered.

In 1404, in response to determining that the retry is allowed for the target operation, the processing engine 112 (e.g., the execution module 1304) (e.g., the processing circuits of the processor 220) may execute the target operation (also can be considered as "execute the retry for the target operation"), In 1406, the processing engine 112 (e.g., the detection module 1306) (e.g., the processing circuits of the processor 220) may detect whether there is an exception (e.g., an exception caused by network anomaly) associated with the execution of the target operation.

In 1408, in response to determining that there is the exception associated with the execution of the target operation, the processing engine 112 (e.g., the second determination module 1308) (e.g., the processing circuits of the processor 220) may determine whether a retry (also can be considered as a "next retry") is needed for the target operation based on the retry strategy.

In some embodiments, as described in connection with operation 710, the processing engine 112 may determine whether the target operation satisfies a predetermined retry condition included in the retry strategy and determine that the retry is needed for the target operation in response to determining that the target operation does not satisfy the predetermined retry condition (also can be considered as "does not reach or exceed the predetermined retry condition"). In some embodiments, the determination may be implemented by executing a takeException function. According to the takeException function, for which exceptions (e.g., an exception caused by network anomaly) a retry is needed may be determined.

In 1410, in response to determining that the retry is unneeded for the target operation, the processing engine 112 (e.g., the second determination module 1308) (e.g., the processing circuits of the processor 220) may stop the target operation.

In some embodiments, in response to determining that the retry is needed for the target operation, the processing engine 112 may determine whether the retry is allowed for the target operation (i.e., the processing engine 112 may execute the process 1400 to return to operation 1402). Further, in response to determining that the retry is allowed for the target operation, the processing engine 112 may execute the target operation.

In some embodiments, as described in connection with operation 612, in response to determining that the retry is needed for the target operation, the processing engine 112 may set a predetermined sleep time and determine whether the retry is allowed for the target operation after the predetermined sleep time has passed. In some embodiments, the predetermined sleep time may be associated with a number count of retries that have been executed for the target operation, for example, the predetermined sleep time may be expressed as formula (1).

In some embodiments, the retry strategy may include the number count of retries that have been executed for the target operation or the predetermined sleep time set for the retry for the target operation. As described in connection with operation 704, the processing engine 112 may determine whether the number count of retries that have been executed for the target operation reaches a count threshold or whether the predetermined sleep time reaches a time threshold. In response to determining that the number count of retries that have been executed for the target operation does not reach the count threshold or the predetermined sleep time does not reach the time threshold, the processing engine 112 may determine that the retry is allowed for the target operation.

In some embodiments, the determination may be implemented by executing an allowRetry function. According to the allowRetry function, a plurality of retry preconditions can be determined and a plurality of retry strategies can be provided. Further, whether a retry is allowed for the target operation can be determined based on the plurality of retry strategies.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional operations (e.g., a storing operation) may be added elsewhere in the process 1400. In the storing operation, the processing engine 112 may store information and/or data (e.g., the predetermined sleep time, the number count of retries, the retry strategy, the target operation parameter) associated with the target operation in a storage device (e.g., the storage 150) disclosed elsewhere in the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "some embodiments." and/or "some embodiments" mean that a particular feature, structure or characteristic described in connection with some embodiments is included in at least one embodiment of the present disclosure. Therefore, it is emphasized and should be appreciated that two or more references to "some embodiments," "one embodiment," or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 1703, Perl, COBOL 1702, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a software as a service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

We claim:

1. A system, comprising:
a storage device to store a set of instructions; and
a processor, communicatively coupled to the storage device, to execute the set of instructions to:
determine, based on a retry strategy included in a retry proxy component, whether a retry is allowed for a target operation, wherein to determine, based on the retry strategy included in the retry proxy component, whether the retry is allowed for the target operation, the processor is to:
determine whether a number count of retries that have been executed for the target operation reaches a count threshold or whether a predetermined sleep time reaches a time threshold; and
determine that the retry is allowed for the target operation in response to determining that the number count of retries that have been executed for the target operation does not reach the count threshold or the predetermined sleep time does not reach the time threshold;
in response to determining that the retry is allowed for the target operation, execute the target operation;
detect whether there is an exception associated with the execution of the target operation;
in response to determining that there is the exception associated with the execution of the target operation, determine, based on the retry strategy, whether a retry is needed for the target operation; and
in response to determining that the retry is unneeded for the target operation, stop the target operation.

2. The system of claim 1, wherein the retry proxy component is initiated manually or is automatically triggered in response to a predetermined event.

3. The system of claim 1, wherein in response to determining that there is the exception associated with the execution of the target operation, to determine, based on the retry strategy, whether the retry is needed for the target operation, the processor is to:
determine whether the target operation satisfies a predetermined retry condition included in the retry strategy; and
determine that the retry is needed for the target operation in response to determining that the target operation does not satisfy the predetermined retry condition.

4. The system of claim 1, wherein the processor is further to:
determine, based on the retry strategy, whether the retry is allowed for the target operation in response to determining that the retry is needed for the target operation; and execute the target operation in response to determining that the retry is allowed for the target operation.

5. The system of claim 4, wherein to determine, based on the retry strategy, whether the retry is allowed for the target operation in response to determining that the retry is needed for the target operation, the processor is to:
  determine, based on the retry strategy, whether the retry is allowed for the target operation after the predetermined sleep time has passed.

6. The system of claim 4, wherein
  to determine, based on the retry strategy, whether the retry is allowed for the target operation in response to determining that the retry is needed for the target operation, the processor is to:
  determine whether the number count of retries that have been executed for the target operation reaches the count threshold or whether the predetermined sleep time reaches the time threshold; and
  determine that the retry is allowed for the target operation in response to determining that the number count of retries that have been executed for the target operation does not reach the count threshold or the predetermined sleep time does not reach the time threshold.

7. The system of claim 1, wherein the processor is further to:
  obtain at least one target operation parameter; and
  obtain the target operation based on the at least one target operation parameter.

8. The system of claim 1, wherein the target operation comprises at least one of accessing a database, reading or writing a file, or initiating a remote call.

9. The system of claim 1, wherein the target operation is associated with an operating function included in the retry proxy component.

10. A method implemented on a computing device having at least one processor, at least one storage medium, and a communication platform connected to a network, the method comprising:
  determining, based on a retry strategy included in a retry proxy component, whether a retry is allowed for a target operation, wherein the determining, based on the retry strategy included in the retry proxy component, whether the retry is allowed for a target operation includes:
    determining whether a number count of retries that have been executed for the target operation reaches a count threshold or whether a predetermined sleep time reaches a time threshold; and
    determining that the retry is allowed for the target operation in response to determining that the number count of retries that have been executed for the target operation does not reach the count threshold or the predetermined sleep time does not reach the time threshold;
  in response to determining that the retry is allowed for the target operation, executing the target operation;
  detecting whether there is an exception associated with the execution of the target operation;
  in response to determining that there is the exception associated with the execution of the target operation, determining, based on the retry strategy, whether a retry is needed for the target operation; and
  in response to determining that the retry is unneeded for the target operation, stopping the target operation.

11. The method of claim 10, wherein the retry proxy component is initiated manually or is automatically triggered in response to a predetermined event.

12. The method of claim 10, wherein in response to determining that there is the exception associated with the execution of the target operation, determining, based on the retry strategy, whether a retry is needed for the target operation includes:
  determining whether the target operation satisfies a predetermined retry condition included in the retry strategy; and
  determining that the retry is needed for the target operation in response to determining that the target operation does not satisfy the predetermined retry condition.

13. The method of claim 10, wherein the method further includes:
  determining, based on the retry strategy, whether the retry is allowed for the target operation in response to determining that the retry is needed for the target operation; and
  executing the target operation in response to determining that the retry is allowed for the target operation.

14. The method of claim 13, wherein determining, based on the retry strategy, whether the retry is allowed for the target operation in response to determining that the retry is needed for the target operation includes:
  determining, based on the retry strategy, whether the retry is allowed for the target operation after the predetermined sleep time has passed.

15. The method of claim 13, wherein the
  determining, based on the retry strategy, whether the retry is allowed for the target operation in response to determining that the retry is needed for the target operation includes:
  determining whether the number count of retries that have been executed for the target operation reaches the count threshold or whether the predetermined sleep time reaches the time threshold; and
  determining that the retry is allowed for the target operation in response to determining that the number count of retries that have been executed for the target operation does not reach the count threshold or the predetermined sleep time does not reach the time threshold.

16. The method of claim 10, wherein the method further includes:
  obtaining at least one target operation parameter; and
  obtaining the target operation based on the at least one target operation parameter.

17. The method of claim 10, wherein the target operation comprises at least one of accessing a database, reading or writing a file, or initiating a remote call.

18. The method of claim 10, wherein the target operation is associated with an operating function included in the retry proxy component.

19. A non-transitory computer readable medium, comprising executable instructions that, when executed by at least one processor, direct the at least one processor to perform a method, the method comprising:
  determining, based on a retry strategy included in a retry proxy component, whether a retry is allowed for a target operation, wherein the determining, based on the retry strategy included in the retry proxy component, whether the retry is allowed for a target operation includes:
    determining whether a number count of retries that have been executed for the target operation reaches a count threshold or whether a predetermined sleep time reaches a time threshold; and
    determining that the retry is allowed for the target operation in response to determining that the number count of retries that have been executed for the target operation does not reach the count threshold or the predetermined sleep time does not reach the time threshold;

in response to determining that the retry is allowed for the target operation, executing the target operation;

detecting whether there is an exception associated with the execution of the target operation;

in response to determining that there is the exception associated with the execution of the target operation, determining, based on the retry strategy, whether a retry is needed for the target operation; and in response to determining that the retry is unneeded for the target operation, stopping the target operation.

* * * * *